US012485348B2

(12) United States Patent
Fukuda et al.

(10) Patent No.: US 12,485,348 B2
(45) Date of Patent: Dec. 2, 2025

(54) COMPUTER-READABLE NON-TRANSITORY STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventors: Yoshiteru Fukuda, Kyoto (JP); Yuichiro Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 274 days.

(21) Appl. No.: 18/502,417

(22) Filed: Nov. 6, 2023

(65) Prior Publication Data

US 2024/0157238 A1 May 16, 2024

(30) Foreign Application Priority Data

Nov. 11, 2022 (JP) ................................ 2022-181366

(51) Int. Cl.
*A63F 13/525* (2014.01)
*A63F 13/537* (2014.01)

(52) U.S. Cl.
CPC .......... *A63F 13/525* (2014.09); *A63F 13/537* (2014.09)

(58) Field of Classification Search
None
See application file for complete search history.

(56) References Cited

U.S. PATENT DOCUMENTS 12,397,230 B1 * 8/2025 Sato ...................... A63F 13/837
2004/0119733 A1 6/2004 Morimoto et al.
2015/0328548 A1 * 11/2015 Sato ...................... A63F 13/63 463/31
2018/0028918 A1 * 2/2018 Tang ...................... G06F 3/0484
2019/0060755 A1 2/2019 Motokura et al.
2020/0206639 A1 7/2020 Nakano et al.
2022/0258046 A1 * 8/2022 Sato ...................... A63F 13/5252
2024/0424401 A1 * 12/2024 Matsuura ................ A63F 13/35

FOREIGN PATENT DOCUMENTS

JP 2004-070821 3/2004
JP 2019-037614 3/2019
JP 2019037614 A 3/2019
JP 2020-103796 7/2020

OTHER PUBLICATIONS

Mar. 5, 2024 Office Action issued in Japanese Patent Application No. 2022-181366, pp. 1-3 [machine translation included].

* cited by examiner

*Primary Examiner* — Ronald Laneau
(74) *Attorney, Agent, or Firm* — Nixon & Vanderhye PC

(57) ABSTRACT

When an operation mode of a first player is a character operation mode, action of a first character is controlled on the basis of an operation by the first player. In addition, when an exit condition is satisfied due to an attack action of a second character, the first character is caused to exit a game stage. When the operation mode of the first player is a photographing mode, a virtual camera is controlled on the basis of an operation by the first player, and an image captured with the virtual camera is stored. Furthermore, an attack against the first character is nullified such that the first character is not caused to exit due to the attack action of the second character, or exit of the first character due to the attack is nullified.

15 Claims, 17 Drawing Sheets

COMPUTER-READABLE NON-TRANSITORY STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2022-181366 filed on Nov. 11, 2022, the entire contents of which are incorporated herein by reference.

FIELD

The present disclosure relates to information processing executed by a computer of a first terminal capable of communicating with at least one second terminal.

BACKGROUND AND SUMMARY

Hitherto, a game in which, during game play, it is possible to switch from normal play to a "photographing mode" in which a game image displayed on a screen can be stored in a storage medium in accordance with an instruction of a player, has been known.

The above game is intended to be played by a single player. Here, a multiplayer game in which multiple players participate is considered. In particular, a game in which each player can control their own player character and in which the player characters can interfere with each other, is assumed. During execution of such a multiplayer game, one of the players may shift to a photographing mode and perform a camera operation. If, during such a camera operation, the player character of the player who has shifted to the photographing mode is affected in some way such as being attacked by another player character, action related to photographing may be interfered with.

Therefore, the present disclosure provides a computer-readable non-transitory storage medium having an information processing program stored therein, an information processing system, an information processing apparatus, and an information processing method that allow a player who is in charge of photographing to perform smooth photographing when a photographing mode is used in a multiplayer game.

For example, the following configuration examples are exemplified.

(Configuration 1)

Configuration 1 is directed to one or more computer-readable non-transitory storage media having stored therein instructions that, when executed by a computer of a first terminal capable of communicating with at least one second terminal, cause the computer of the first terminal to:

execute a game in which a game situation is synchronized with the second terminal;

when an operation mode of a first player of the first terminal is a character operation mode in the game, cause a first character in a virtual space to perform at least a movement action or an attack action in a game stage which is the virtual space, on the basis of an operation input by the first player, cause a second character in the virtual space to perform at least a movement action or an attack action in the game stage, on the basis of communication data received from the second terminal, cause the first character to at least temporarily exit the game stage when an exit condition for the first character is satisfied due to the attack action by the second character, and switch the operation mode of the first player from the character operation mode to a photographing mode when an operation mode change condition for the first player is satisfied in the game; and when the operation mode of the first player is the photographing mode in the game, control at least any one of a position, an orientation, and an angle of view of a photographing virtual camera for photographing the virtual space, on the basis of an operation input by the first player, store an image based on the photographing virtual camera in a memory in accordance with an image storing operation input by the first player, and nullify an attack of the second character against the first character such that the exit condition for the first character is not satisfied due to the attack action of the second character, or nullify exit of the first character from the game stage due to the attack action.

According to the above configuration example, an attack from the second character against the first character is nullified in the photographing mode. Therefore, a situation in which a photographing operation by the first player is disabled due to the first character receiving the attack action of the second character in the photographing mode can be prevented. Accordingly, the first player is allowed to smoothly perform a photographing operation in the photographing mode.

(Configuration 2)

According to Configuration 2, in Configuration 1 described above, when the operation mode of the first player is the photographing mode, control of the first character based on an operation input by the first player may be restricted.

According to the above configuration example, when the operation mode is the photographing mode, the object to be operated by the first player is switched from the first character to the photographing virtual camera. Accordingly, the first character can also be the object (subject) to be photographed.

(Configuration 3)

According to Configuration 3, in Configuration 2 described above, the instructions may further cause the computer of the first terminal to, when the operation mode of the first player is the photographing mode, start count of a timer in which a predetermined time is set, and store an image based on the photographing virtual camera when the timer reaches the predetermined time after the start of the count. Until the predetermined time is reached after the start of the count of the timer, control of the photographing virtual camera based on the operation input by the first player may be restricted, and the restriction of the control of the first character based on the operation input may be cancelled.

According to the above configuration example, when the photographing timer is activated in the photographing mode, the object to be operated by the first player can be returned to the first character during the count of the timer. Therefore, during the count of the timer, the position of the first character can be adjusted or the first character can be caused to take a predetermined pose. Accordingly, the convenience of the player when the player desires to capture an image in which the first character is seen can be improved.

(Configuration 4)

According to Configuration 4, in Configuration 1 described above, the instructions may further cause the computer of the first terminal to: display a timer image showing a time to be taken until the predetermined time is reached, until the predetermined time is reached after the start of the count of the timer; and transmit information for displaying the timer image on the second terminal, to the second terminal.

According to the above configuration example, the first player and the second player are allowed to grasp the remaining time until photographing is performed.

(Configuration 5)

According to Configuration 5, in any one of Configurations 1 to 3 described above, the instructions may further cause the computer of the first terminal to: place a drone object at a position corresponding to the photographing virtual camera when the operation mode of the first player is switched from the character operation mode to the photographing mode; and control at least one of a position and an orientation of the drone object in accordance with a content of control of the photographing virtual camera based on the operation input by the first player when the operation mode of the first player is the photographing mode.

According to the above configuration example, when the first player enters the photographing mode, the drone object is displayed. Therefore, the second player is allowed to grasp that the first player has entered the photographing mode. In addition, the second player is allowed to easily determine a location to be photographed.

(Configuration 6)

According to Configuration 6, in Configuration 5 described above, the instructions may further cause the computer of the first terminal to, when the operation mode of the first player is the photographing mode,

- display a photographing range image showing a photographing range of the photographing virtual camera; and
- transmit information for displaying the photographing range image on the second terminal, to the second terminal.

According to the above configuration example, the photographing range of the photographing virtual camera can be visually recognized. Accordingly, the second player is allowed to easily determine where to go to be seen in a captured image.

(Configuration 7)

According to Configuration 7, in Configuration 6 described above, the angle of view of the photographing virtual camera may be changeable in accordance with an angle-of-view change operation input by the first player, and the instructions may further cause the computer of the first terminal to: update the photographing range image in accordance with change of the angle of view; and transmit information for displaying, on the second terminal, the photographing range image after the change of angle of view, to the second terminal.

(Configuration 8)

According to Configuration 8, in any one of Configurations 1 to 7 described above, the instructions may further cause the computer of the first terminal to: when the exit condition for the first character is satisfied regardless of the attack action of the second character, cause the first character to at least temporarily exit the game stage regardless of the operation mode of the first player; and when the exit condition for the first character is satisfied when the operation mode is the photographing mode, switch the operation mode to the character operation mode.

According to the above configuration example, when the exit condition for the first character is satisfied due to a cause other than an attack from the second character, the photographing mode is cancelled, and the operation mode returns to the character operation mode. Therefore, for example, a situation in which even when the first character is caused to exit the game stage due to falling off the game stage, the photographing mode is kept and the first character cannot be operated, can be prevented. Accordingly, convenience of operating the first character can be improved.

(Configuration 9)

According to Configuration 9, in any one of Configurations 1 to 8 described above, even when the operation mode of the first player is the photographing mode, an attack against the second character may not necessarily be nullified.

According to the above configuration example, even in the photographing mode, for example, attack actions between second characters are not nullified but are reflected, so that an image with normal game behavior can be captured for the characters other than the first character.

(Configuration 10)

According to Configuration 10, in any one of Configurations 1 to 9 described above, the game may be executable by the first terminal alone without communication with the second terminal, and the instructions may further cause the computer of the first terminal to, when switching the operation mode,

- when the game is executed without communication with the second terminal, stop passage of time in the game when the operation mode is switched from the character operation mode to the photographing mode, and cancel the stop of the passage of the time when the operation mode is switched from the photographing mode to the character operation mode, and
- when the game is executed while a game situation is synchronized with the second terminal, not to stop the passage of the time in the game even when the operation mode is switched from the character operation mode to the photographing mode.

According to the above configuration example, when multiple players play the game, the time in the game is not stopped even if the photographing mode is entered. Accordingly, the other players can be prevented from being confused due to sudden stop of the time in the game.

(Configuration 11)

According to Configuration 11, in any one of Configurations 1 to 10 described above, the instructions may further cause the computer of the first terminal to transmit the stored image to the second terminal.

According to the above configuration example, an image captured by the first player can be shared by all the participants of the game.

(Configuration 12)

According to Configuration 12, in Configuration 5 described above, the instructions may further cause the computer of the first terminal to create a virtual room in which players participating in the game can gather. A player who has created the virtual room, among the players participating in the game, may be the first player, and only the first player may be allowed to switch the operation mode from the character operation mode to the photographing mode.

According to the above configuration example, confusion among players as to who is in charge of photographing due to allowing multiple players to perform photographing at the same time can be prevented.

According to the present disclosure, the first player is allowed to smoothly perform a photographing operation in the photographing mode.

DETAILED DESCRIPTION OF NON-LIMITING EXAMPLE EMBODIMENTS

Figure 1:
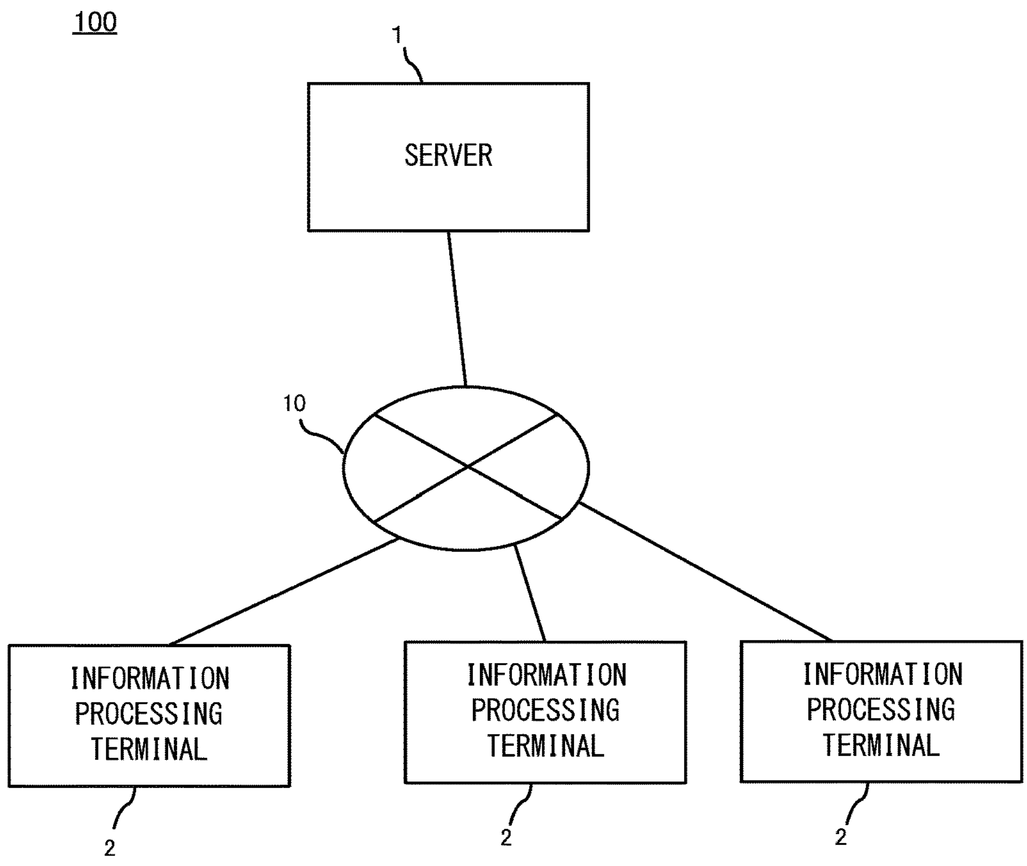
FIG. 1 is a schematic diagram showing a non-limiting example of the entire configuration of an information processing system according to an exemplary embodiment.

Hereinafter, one exemplary embodiment of the present disclosure will be described. FIG. 1 is a schematic diagram showing the entire configuration of an information processing system (game system) according to the exemplary embodiment. An information processing system 100 of the exemplary embodiment includes a server 1 and a plurality of information processing apparatuses 2. The server 1 and each information processing apparatus 2 are configured to be able to communicate with each other via a network 10 such as the Internet. In the exemplary embodiment, with such a configuration, information processing is executed. Hereinafter, a description will be given with game processing as an example of the information processing. Specifically, it is assumed as an example that a game program is installed on the information processing apparatus 2 and the game processing is executed while the information processing apparatus 2 is communicating with the server 1 as necessary.

[Hardware Configuration of Server]

Figure 2:
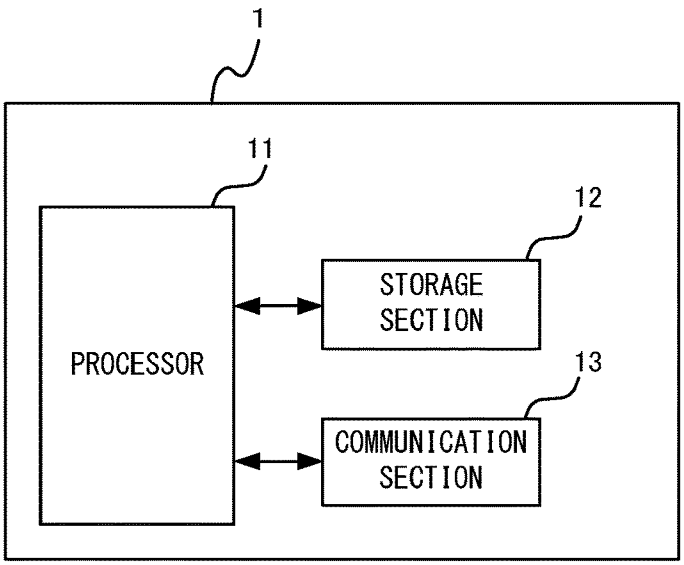
FIG. 2 is a block diagram showing a non-limiting example of the hardware configuration of a server 1.

Next, the hardware configuration of the server 1 will be described. FIG. 2 is a block diagram illustrating the hardware configuration of the server 1. The server 1 includes at least a processor 11, a storage section 12, and a communication section 13. The processor 11 executes various programs for controlling the server 1. In the storage section 12, various programs to be executed by the processor 11 and various kinds of data to be used by the processor 11 are stored. The communication section 13 connects to a network by means of wired or wireless communication and transmits/receives predetermined data to/from each information processing apparatus 2 or another server (not shown).

[Hardware Configuration of Information Processing Apparatus]

Next, the information processing apparatus 2 will be described. The information processing apparatus 2 is, for example, a smartphone, a stationary or hand-held game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus 2.

Figure 3:
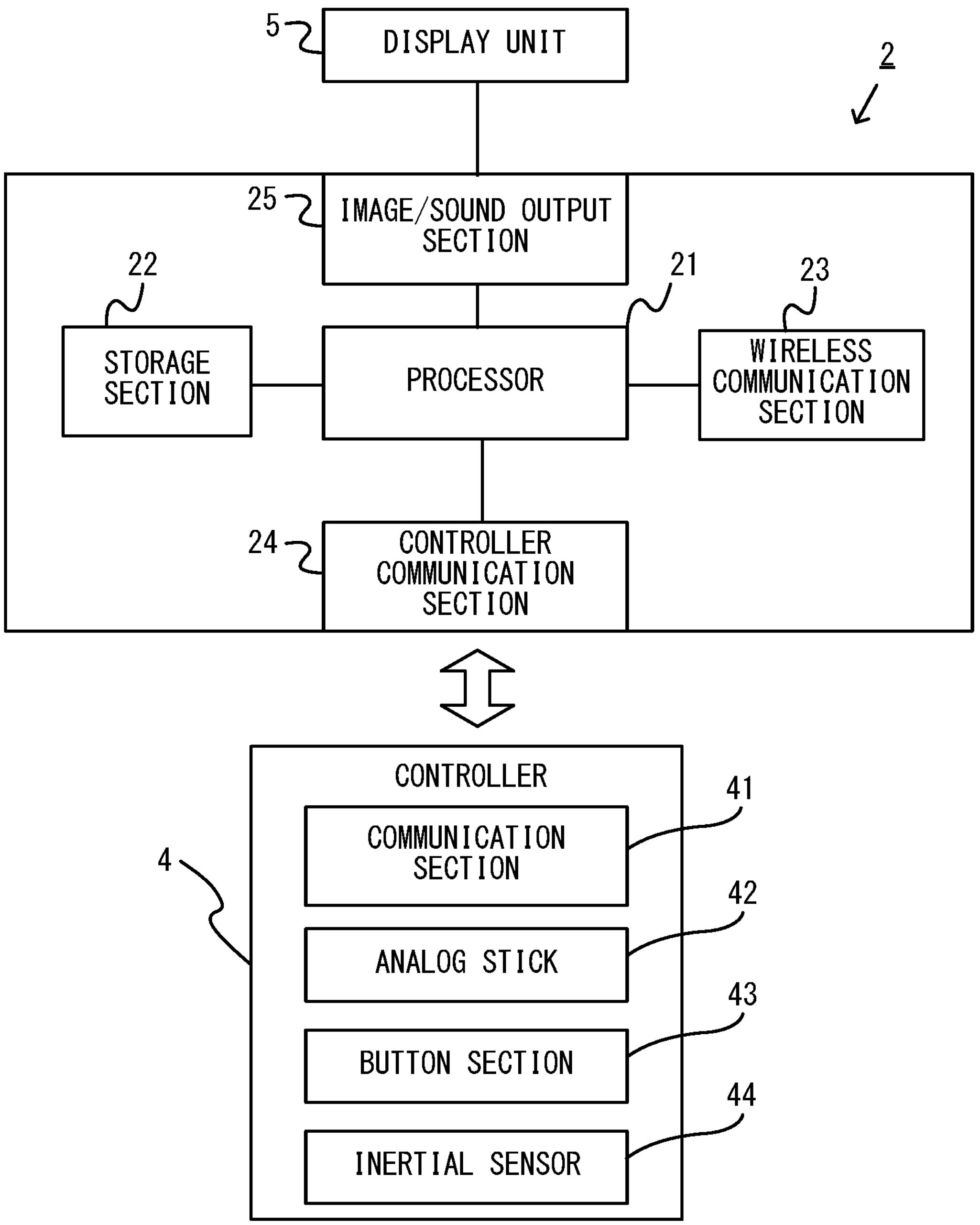
FIG. 3 is a block diagram showing a non-limiting example of the hardware configuration of a game apparatus 2.

FIG. 3 is a block diagram showing an example of the hardware configuration of a game apparatus 2 according to the exemplary embodiment. In FIG. 3, the game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs the various types of information processing by executing an information processing program (e.g., a game program) stored in a storage section 22. The storage section 22 may be, for example, an internal storage medium such as a flash memory and a dynamic random access memory (DRAM), or may be configured to utilize an external storage medium mounted to a slot that is not shown, or the like.

The game apparatus 2 also includes a wireless communication section 23 for the game apparatus 2 to perform wireless communication with another game apparatus 2 or a predetermined server device. As this wireless communication, for example, internet communication or short-range wireless communication is used.

The game apparatus 2 also includes a controller communication section 24 for the game apparatus 2 to perform wired or wireless communication with a controller 4.

Moreover, a display unit 5 (for example, a television or the like) is connected to the game apparatus 2 via an image/sound output section 25. The processor 21 outputs an image and sound generated (for example, by executing the above information processing) to the display unit 5 via the image/sound output section 25.

Next, the controller 4 will be described. Although not shown, the controller 4 of the exemplary embodiment has a housing having a vertically long shape, and can be held in the orientation in which the housing is vertically long. The housing has a shape and a size that allow the housing to be held with one hand when the housing is held in the orientation in which the housing is vertically long.

The controller 4 includes at least one analog stick 42 which is an example of a direction input device. The analog stick 42 can be used as a direction input section with which a direction can be inputted. By tilting the analog stick 42, a user is allowed to input a direction corresponding to the tilt direction (also input a magnitude corresponding to the tilt angle). In addition, the controller 4 includes a button section 43 including various operation buttons. For example, the controller 4 may include a plurality of operation buttons on a main surface of the housing. The operation buttons are, for example, A, B, X, and Y buttons, a plus button, a minus button, an L button, an R button, etc.

Moreover, the controller 4 includes an inertial sensor 44. Specifically, the controller 4 includes an acceleration sensor and an angular velocity sensor as the inertial sensor 44. In the exemplary embodiment, the acceleration sensor detects the magnitudes of accelerations along predetermined three axial directions. In addition, the angular velocity sensor detects angular velocities about predetermined three axes.

The controller 4 also includes a communication section 41 for performing wired or wireless communication with the controller communication section 24. The content of a direction input to the analog stick 42, information indicating the press state of the button section 43, and various detection results by the inertial sensor 44 are repeatedly outputted to the communication section 41 and transmitted to the game apparatus 2 at appropriate timings.

[Game Assumed in Exemplary Embodiment]

Next, game processing executed in the exemplary embodiment will be described. First, the outline of a game assumed in the exemplary embodiment will be described. The game assumed in the exemplary embodiment is a multiplayer game in which players can play against each other. Multiplay means that multiple players play the same game simultaneously via a communication network. The communication network may be communication using the internet, or may be short-range wireless communication. In the exemplary embodiment, players who participate in multiplay enter a virtual room and perform multiplay on a per-room basis. In the exemplary embodiment, the virtual room is a virtual space that imitates a predetermined room.

The game assumed in the exemplary embodiment has two game modes as follows. The first one is a “competitive mode”. The competitive mode is a game mode in which multiple players are divided into two teams and compete against each other in a “stage” which is a virtual space that is a stage for competition. For example, eight players are divided into two teams each including four players, and each team competes for the number of defeats within a predetermined time limit (e.g., 3 minutes).

The other game mode is a “non-competitive mode”. This game mode is a game mode in which each player can basically perform the same actions as in the competitive mode in the above stage but a win-loss determination is not performed. That is, this game mode is a game mode in which it is possible to “preview” the above stage and to “practice” or “simulate” the game for the “competitive mode”.

In the game, the non-competitive mode can be executed by multiple players or only by one player. In a state where there is only one player in the above room, if the game is started with the above non-competitive mode, a non-competitive mode with only one player can be played. In a state where there are multiple players in the room, if the game is started with the above non-competitive mode, a non-competitive mode in which multiple players participate can be played. Hereinafter, the non-competitive mode with only one player is referred to as “one-player non-competitive mode”, and the non-competitive mode in which multiple players participate is referred to as “multiple-player non-competitive mode”. The processing of the exemplary embodiment described below is processing mainly related to the multiple-player non-competitive mode.

Next, the outline of the process from the start to the end of the above multiple-player non-competitive mode and an example of operations will be described. First, one of multiple players participating in the game performs a predetermined operation for room creation, thereby creating the above room. Hereinafter, the player who has created the room is referred to as “host player”, and the game apparatus 2 of the host player is referred to as “host player machine”. The participants other than the host player are referred to as “guest players”, and the game apparatus 2 of each guest player is referred to as “guest player machine”. A player character operated by the host player is referred to as “host character”, and each player character operated by each guest player is collectively referred to as “guest character”. In the exemplary embodiment, the maximum number of players who can participate in one room is eight, and a description will be given below with the case where eight players participate as an example.

After the room is created, the host character moves into the virtual room and waits for guest players to participate. Then, in the room, the host player can select a predetermined stage and set whether to play in the competitive mode or the non-competitive mode using this stage. Here, it is assumed that the host player sets to play the predetermined stage in the non-competitive mode. The host player also divides participating players into teams.

When each player completes their play preparation, each player performs an operation indicating “ready”, for example. Then, when eight players gather and all the players are “ready”, the game is started with the non-competitive mode. That is, all the player characters move from the room to the above stage, and each player character is placed at a predetermined position determined for each team. Then, until a predetermined time limit elapses after the game is started, each player can cause their own player character to perform the same actions as in the competitive mode. Specifically, each player can cause the player character to perform “movement” and “attack action”. The attack action is, for example, shooting. Each player can cause each player character to perform shooting using a weapon equipped by the player character. When a player character is attacked, the player character is damaged or blown away. Then, for example, when the hit points (HP) of the player character reach zero, the player character exits the stage once, and respawns at a predetermined location. As for a condition for causing this respawn (hereinafter, referred to as exit condition), in addition to the HP reaching 0, the exit condition is also satisfied when the player character falls off the stage. For example, the player character may fall off the stage when the player performs an operation such that the player character steps off the stage. In addition, the player character may fall off the stage when the player character is forcibly moved, for example, by being attacked by another player character to be blown away. Moreover, the player character may fall off the stage when the player character is forcibly moved by a predetermined gimmick in the stage.

As described above, in the multiple-player non-competitive mode, each player character can be caused to perform the same movement or attack action as in the competitive mode. In the non-competitive mode, as described above, a win/loss determination is not performed, and thus each player can operate the player character in various ways and preview the structure of the stage without worrying about a win or a loss. When the predetermined time limit elapses, the multiple-player non-competitive mode automatically ends, and each player character returns to the above room. Then, each player can end the game by exiting the room or by the host player breaking up the room. Of course, each player can continue the game in the competitive mode or the non-competitive mode without exiting or the like. The above time limit in the non-competitive mode is preset to be longer than the time limit in the competitive mode. For example, the time limit in the competitive mode is 3 minutes, and the time limit in the non-competitive mode is 60 minutes. From the viewpoint of previewing the stage or practicing as described above, the longer time limit is set. The time limit may be freely settable by the host player.

[Photographing Mode]

Here, the host player can switch an operation mode to a "photographing mode" in the game with the multiple-player non-competitive mode. When the operation mode is switched to the photographing mode, the object to be operated by the host player is switched from the host character to a virtual camera. Then, the host player can freely operate the virtual camera in the stage and "photograph" the virtual space at any timing. That is, the host player can become a cameraman and photograph the actions, etc., of each player in the multiple-player non-competitive mode from a predetermined position. In the following description, as for the operation mode of the host player, an operation mode that is not the "photographing mode" is referred to as "character operation mode".

Here, in the photographing mode, the host player can directly operate the virtual camera, but in general, the virtual camera is an element that is not displayed on a screen. In this regard, in the game, when the host player enters the photographing mode, a "drone object" is caused to appear and be placed at the position of the virtual camera. Then, in the photographing mode, the host player basically operates the drone object. That is, an operation of moving the drone object is an operation of moving the virtual camera. By causing such an object corresponding to the virtual camera to appear visually, it is made easier for each guest player to recognize that the host player is currently in the photographing mode and to recognize where to go to be photographed.

Figure 4:
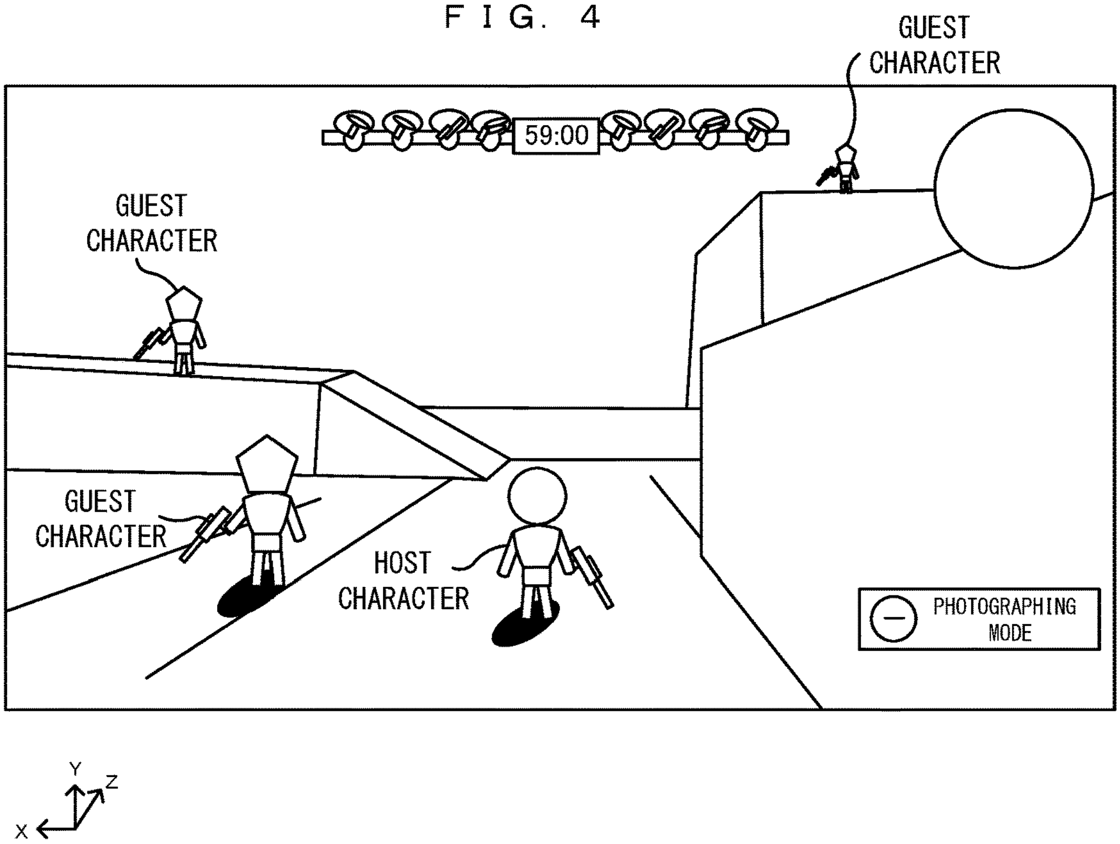
FIG. 4 illustrates a non-limiting example of a game screen.

Hereinafter, examples of screens and operations in the photographing mode will be described. FIG. 4 shows an example of a screen on the host player machine when the operation mode of the host player is the character operation mode. It is assumed that the default operation mode in the non-competitive mode is the character operation mode. In FIG. 4, a game image including the host character and three guest characters is displayed. Here, in the game, a game image is displayed as a third-person screen with the player character set as a gazing point. Therefore, in principle, the virtual camera is placed at a predetermined distance behind the player character and is controlled to move so as to follow the player character. Hereinafter, the placement position of the virtual camera in the character operation mode is referred to as "default camera position". In the exemplary embodiment, a description will be given with a game in a third-person view as an example, but the processing of the exemplary embodiment is applicable to a game in a first-person view.

In FIG. 4, as a user interface (UI) image in the character operation mode, an image showing the time limit and the team division of the players and an image showing the weapon equipped by each player are displayed in an upper portion of the screen. In addition, a circular mini-map image is displayed in the upper right corner of the screen. These images are also displayed in the competitive mode. That is, the same UI image is displayed as in the competitive mode. Moreover, an operation guide image is also displayed in the lower right corner of the screen. The operation guide image shows that it is possible to shift to the photographing mode by pressing the minus button of the above controller 4. The operation guide image showing the operation to shift to the photographing mode is only displayed on the screen of the host player.

Figure 5:
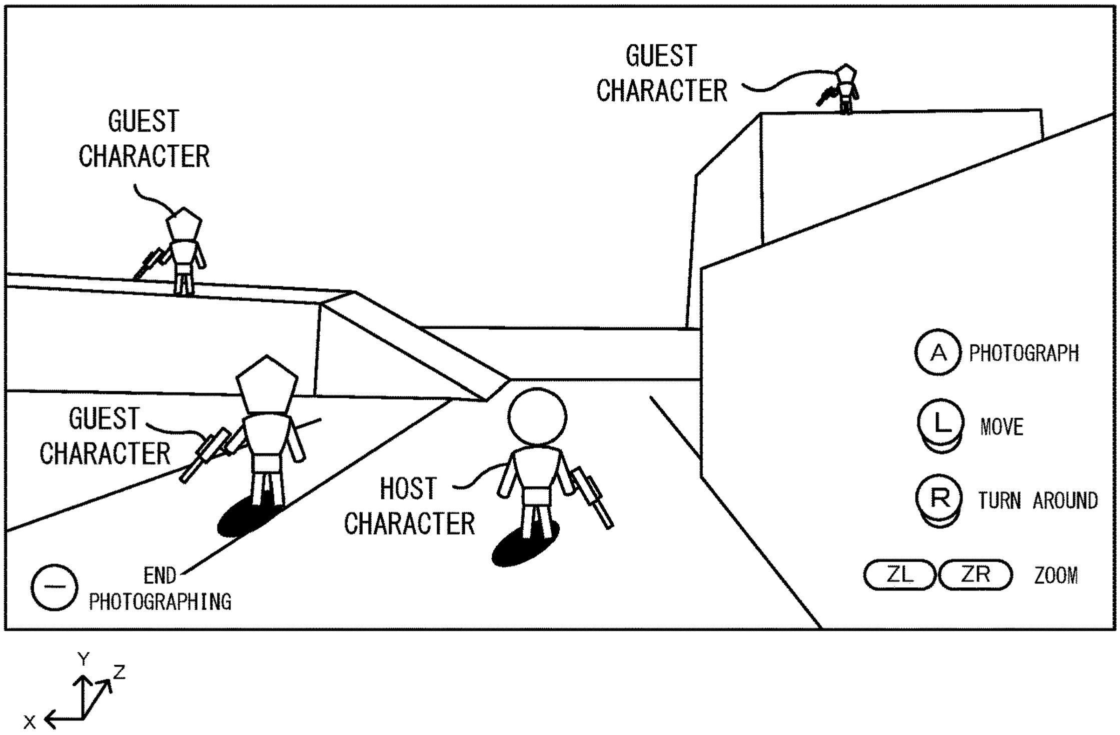
FIG. 5 illustrates a non-limiting example of the game screen.

When the host player presses the minus button in a state where the above screen is displayed, the host player shifts to the photographing mode, and a screen is displayed as shown in FIG. 5. In FIG. 5 showing the state immediately after shifting to the photographing mode, the position of the virtual camera itself has not changed, and thus there is no significant change in the image of the virtual space, but the UI image has changed to a UI image for the photographing mode. Hereinafter, the UI image in the "character operation mode" is referred to as "normal UI", and the UI image for the photographing mode is referred to as "photographing UI". In the example in FIG. 5, an image showing a method for operating the drone object (virtual camera) is displayed as the photographing UI in the lower right corner of the screen. In addition, an operation guide image showing a method for ending the photographing mode is displayed in the lower left corner of the screen.

Figure 6:
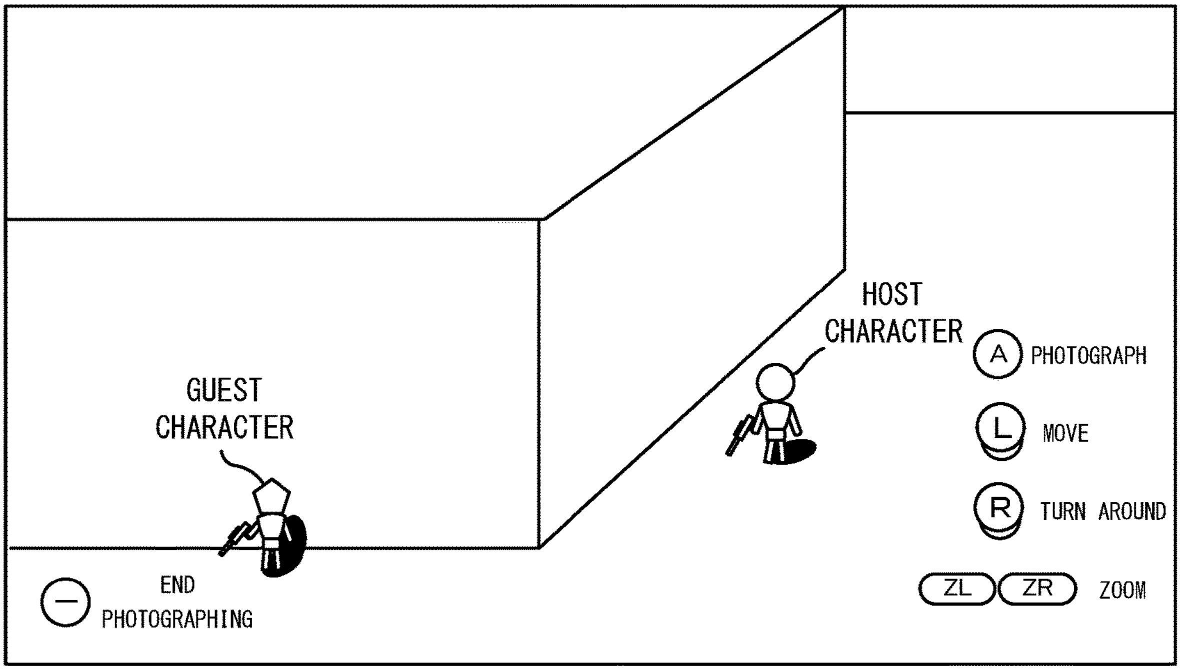
FIG. 6 illustrates a non-limiting example of the game screen.

When the host player shifts to the photographing mode as described above, the host player can move the drone object by operating the controller 4. That is, an operation by the host player is reflected in the movement of the drone object, and is not reflected in the host character. Therefore, in the photographing mode, basically, the host character does not move from the position at the time of shifting to the photographing mode. As a result of the host player moving the drone object in the photographing mode, for example, a game image is displayed as shown in FIG. 6. In FIG. 6, a screen obtained when the drone object is moved to a position away to some extent in the forward direction of the host character in FIG. 5 and the photographing direction of the drone object is set to a direction where the host character is present, is displayed.

As described above, in the photographing mode, the host player can move the drone object. Then, by pressing a photographing button (e.g., the A button) at a predetermined position, the host player can capture an image of the virtual space as seen from the drone object. Also, by performing a predetermined cancellation operation (in this example, pressing the minus button), the host player can end the photographing mode and return to the character operation mode.

Figure 7:
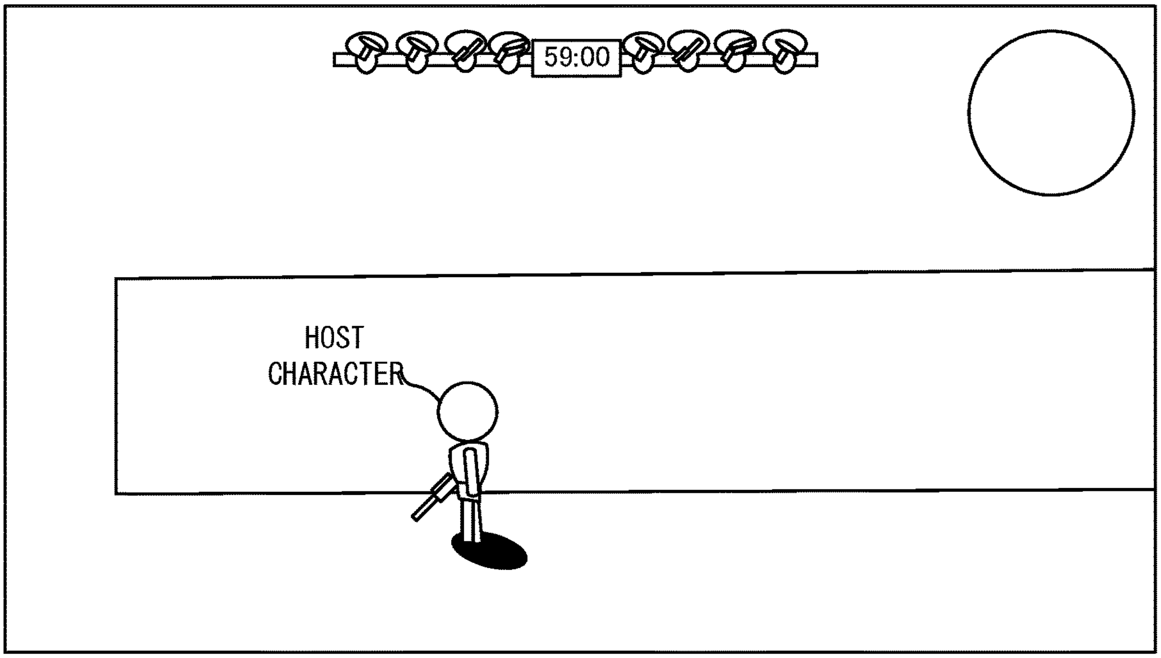
FIG. 7 illustrates a non-limiting example of the game screen.
Figure 8:
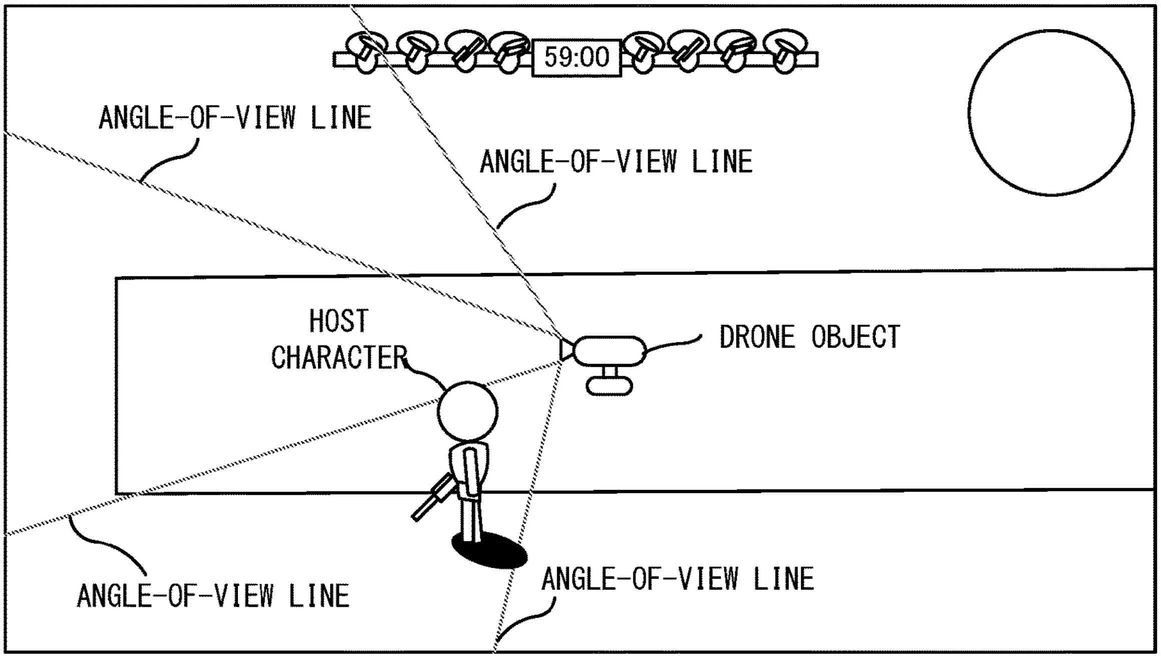
FIG. 8 illustrates a non-limiting example of the game screen.

Next, an example of a game screen on the guest player machine when the host player is in the photographing mode will be described. FIG. 7 illustrates an example of a screen when the operation mode of the host player is the character operation mode, and FIG. 8 illustrates an example of a screen when the operation mode of the host player is the photographing mode. In FIG. 8 in the photographing mode, the drone object is displayed, but in FIG. 7 in the character operation mode, the drone object is not displayed. Therefore, the guest player can determine whether or not the host player has shifted to the photographing mode, on the basis of the presence/absence of the drone object. Also, in FIG. 8, four straight lines are displayed together with the drone object. These straight lines indicate the angle of view (viewing angle) of the drone object corresponding to the virtual camera of the host player. Hereinafter, these straight lines are referred to as “angle-of-view lines”. The angle-of-view lines correspond to four corners of a viewing region of the drone object (virtual camera), respectively. By displaying these angle-of-view lines together with the drone object, it is made easier for the guest player to recognize the photographing range of the drone object. For example, it becomes easier for the guest player to recognize where to move to be captured by the camera, and it becomes easier to cause the guest character to perform actions such as moving the guest character into the range of the angle-of-view lines. Also, as will be described later, in synchronization with an operation by the host player, the drone object on the screen of the guest player moves or rotates, or the angle-of-view lines widen and narrow, thereby making it easier for the guest player to recognize how the guest character is to be moved.

In the exemplary embodiment, the above photographing range is indicated by the angle-of-view lines, but the means for indicating the photographing range is not limited to the angle-of-view lines, and the photographing range may be presented in any manner as long as the photographing range can be recognized.

[Timer]

The host player can also use a photographing timer in the above photographing mode. Specifically, in the game, a value of 10 seconds is preset as a timer time. Therefore, it is possible to perform photographing when 10 seconds elapse after the start of the timer. Here, during a timer period from the start of the timer until the timer time elapses, the object to be operated by the host player is temporarily switched to the host character. Therefore, the host player can move the host character during the timer period. In this case, the position of the drone object is fixed, and the drone object does not follow the movement of the host character. For example, when the timer is started on the screen shown in FIG. 6 above, the position of the virtual camera is fixed at that time. Therefore, the host player moves the host character in the fixed screen as shown in FIG. 6.

Figure 9:
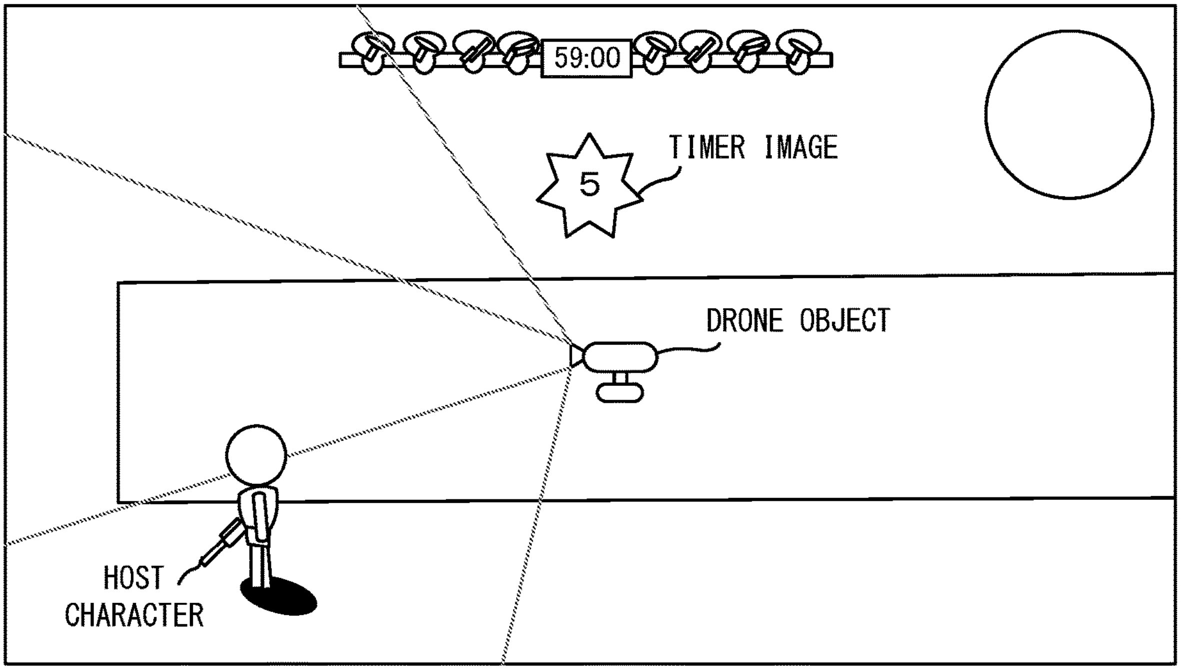
FIG. 9 illustrates a non-limiting example of the game screen.

During the timer period, an image showing the count of the timer is displayed on both the host player machine and the guest player machine. FIG. 9 shows an example of a screen on the guest player machine during the timer period. As shown in FIG. 9, during the timer period, a timer image showing the count of the timer is displayed on the screen of the guest player machine. By referring to this, the guest player can determine whether or not to move into the photographing range of the drone object, for example. In addition, by referring to the count of the timer, the guest player can make decisions to perform an action, etc., such as jumping or activating a special technique associated with the character.

In the exemplary embodiment, the timer time is a fixed value of 10 seconds as an example, but may be freely settable by the player.

Here, if the host character satisfies the above exit condition in the photographing mode, respawn occurs as described above. If the exit condition is satisfied in such a photographing mode, the photographing mode is forcibly ended at that time to shift to the character operation mode. For example, if, as a result of moving the host character during the above timer period, the host character falls off the stage, the photographing mode ends at that time. Then, when the host character reappears at the respawn point, the operation mode has been returned to the character operation mode.

In addition, the photographing mode can also be forcibly ended when the time limit elapses in the photographing mode, or when, even within the time limit, the guest player performs an operation indicating that the guest player quits the game with the multiple-player non-competitive mode.

In the exemplary embodiment, each guest player is not allowed to switch to the photographing mode. This is for the following reasons. If each guest player is also allowed to shift to the photographing mode, when a plurality of players shift to the photographing mode at the same time, a plurality of drone objects appear. In this case, it becomes difficult for each player to recognize which drone is used to perform photographing, which may lead to confusion. Therefore, in the exemplary embodiment, such confusion is prevented by allowing only the host player to use the photographing mode.

[Attack Nullifying Setting]

Meanwhile, in the multiple-player non-competitive mode, movement and attack action of each player character are enabled as in the competitive mode, as described above. On the other hand, in principle, the host character cannot move in the above photographing mode. Therefore, when the host character is in the photographing mode, if the guest character performs an attack action against the host character, the exit condition may be satisfied for the attacked host character. For example, as a result of the attack, the HP can reach 0, or the host character can be blown off the stage, whereby the exit condition can be satisfied. Then, as described above, if the exit condition is satisfied in the photographing mode, the photographing mode is forcibly ended. Therefore, from the host player's point of view, the result can be that the guest player interferes with photographing action. Therefore, in the exemplary embodiment, the host character is set such that the above exit condition is not satisfied due to an attack from the guest player in the above photographing mode. Specifically, in the exemplary embodiment, when the host player shifts to the photographing mode, the host character is temporarily equipped with a “special armor” that repels all attacks from the guest characters. Then, when the photographing mode ends, the “special armor” is removed. Accordingly, in the photographing mode, even if the host character is attacked by the guest character, this attack can be nullified. Accordingly, the HP of the host character can be prevented from reaching 0, and the position of the host character can be prevented from being changed due to the host character being blown away by the attack or the like. That is, the photographing mode can be prevented from being forcibly ended due to the attack by the guest character. Accordingly, the host player can concentrate on photographing action. Also, the guest player can cause the guest character to act without worrying about results that may interfere with photographing by the host player, so that the guest player can freely control the guest character.

Also, even in the photographing mode, the above attack nullifying setting is not performed for the guest character. Therefore, even in the photographing mode, attack actions between the guest characters are reflected as usual. Accordingly, it is possible for the host player to enjoy photographing the moment when the guest characters attack each other and one of the guest characters is defeated. In particular, when photographing such a “moment” is considered, it is made less likely to miss the right moment for photographing by preventing each guest player from interfering through the above attack nullifying setting. As a result, it can be said that the convenience of the host player in photographing work can be improved.

In this example, an example of equipping the host character with the "special armor" will be described, but a method other than the above may be used as long as the host character can be prevented from exiting due to an attack by the guest character. For example, the HP of the host character may be temporarily increased without equipping the host character with the "special armor". In this case, the HP may be increased such that the HP cannot be decreased to 0 within the time limit even if the host character is continuously attacked. For example, the execution of the attack action of each guest character itself may be restricted in the photographing mode. That is, while the host character is in the photographing mode, all the player characters may be unable to perform attack actions and may only be able to move. In addition to this method of changing the performance of the player characters themselves or restricting the actions of the player characters, a method of temporarily changing the exit condition itself may be used. For example, setting or control may be performed such that the host character receives attacks from the guest characters and the HP of the host character also decreases but the host character is not caused to exit even if the HP reaches 0. In this case, setting is performed for the host character such that the exit condition itself is temporarily changed in the photographing mode.

In the exemplary embodiment, since the host character nullifies attacks from the guest characters in the photographing mode, the exit condition is not satisfied due to these attacks, but there is still room for the exit condition to be satisfied due to causes other than the attacks. For example, if the host character falls off the stage as result of the host player moving the host character during the timer period, the photographing mode is forcibly ended at that time. This is because, for example, if the host character falls off the stage in the photographing mode but is not caused to exit, it is considered to be rather inconvenient or unnatural behavior.

As described above, in the exemplary embodiment, in the multiple-player non-competitive mode, while the operation mode of the host character is the photographing mode, the host character is restricted from exiting the stage on the basis of an attack by the guest player. Accordingly, the host player can concentrate on photographing action, and the convenience of the photographing mode is improved.

[Details of Game Processing of Exemplary Embodiment]

Next, the game processing in the exemplary embodiment will be described in more detail with reference to FIG. 10 to FIG. 21.

[Data to be Used]

First, various kinds of data used in the exemplary embodiment will be described. Data used in the server 1 will be described, and then data used in the game apparatus 2 will be described.

[Data Stored in Server 1]

Figure 10:
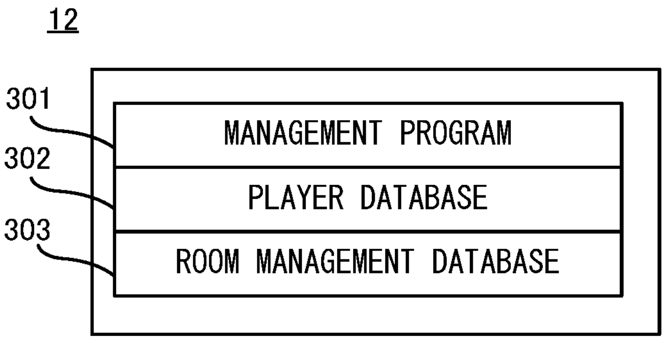
FIG. 10 illustrates a memory map showing a non-limiting example of various kinds of data stored in a storage section 12 of the server 1.

FIG. 10 illustrates a memory map showing an example of various kinds of data stored in the storage section 12 of the server 1. In the storage section 12, a management program 301, a player database 302, a room management database 303, etc., are stored.

The management program 301 is a program for implementing various functions executed by the server 1 in the game processing according to the exemplary embodiment.

The player database 302 is a database regarding each player participating in the game. Specifically, the player database 302 includes account information such as an account ID of each player.

The room management database 303 is a database for managing the above room. Specifically, each record in the room management database 303 includes information identifying the room created by the host player, information indicating each player participating in each room, etc.

In addition, although not shown, various kinds of data, etc., to be transmitted to the game apparatus 2 can also be generated as appropriate and stored in the storage section 12. Moreover, various kinds of data received from the game apparatus 2 can also be temporarily stored in the storage section 12.

[Data Stored in Game Apparatus 2]

Figure 11:
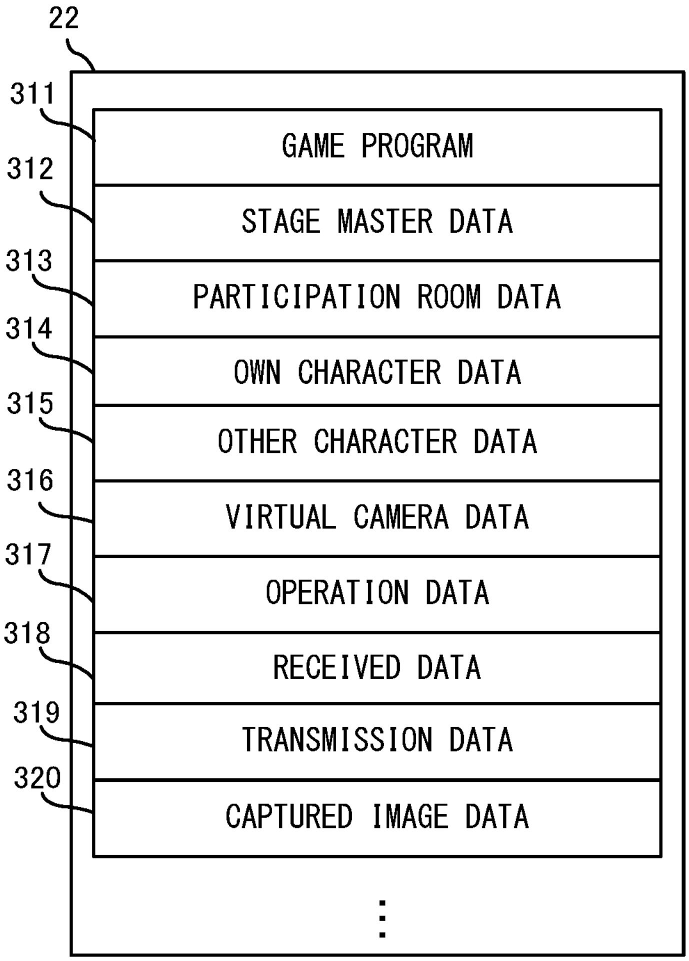
FIG. 11 illustrates a memory map showing a non-limiting example of various kinds of data stored in a storage section 22 of the game apparatus 2.

Next, data stored in the game apparatus 2 will be described. FIG. 11 illustrates a memory map showing an example of various kinds of data stored in the storage section 22 of the game apparatus 2. In the storage section 22 of the game apparatus 2, a game program 311, stage master data 312, participation room data 313, own character data 314, other character data 315, virtual camera data 316, operation data 317, received data 318, transmission data 319, captured image data 320, etc., are stored.

The game program 311 is a program for executing the game processing according to the exemplary embodiment.

The stage master data 312 is data that defines the configuration of each stage used in the above game. Specifically, the stage master data 312 includes information indicating the terrain of each stage, and information indicating the actions, etc., of various gimmicks prepared for each stage.

The participation room data 313 is information for identifying the room in which each player is participating. The participation room data 313 also includes information (player ID or the like) identifying each player participating in the room, and information (network address or the like) identifying the game apparatus of the player.

Figure 12:
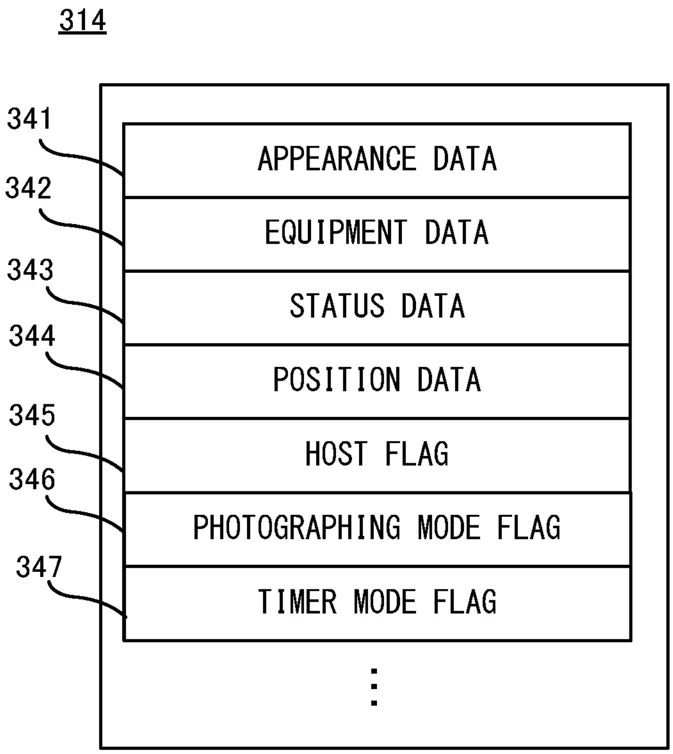
FIG. 12 illustrates a non-limiting example of the data structure of own character data 314.

The own character data 314 is data regarding the player character to be operated by the player. FIG. 12 illustrates an example of the data structure of the own character data 314. In FIG. 12, the own character data 314 includes appearance data 341, equipment data 342, status data 343, position data 344, a host flag 345, a photographing mode flag 346, a timer mode flag 347, etc. The appearance data 341 is data indicating the appearance of the player character. In the game, the appearance of the player character can be customized, and data for indicating the customized appearance is included. The equipment data 342 is information indicating a weapon, etc., equipped by the player character in the non-competitive game of the exemplary embodiment. The status data 343 is information indicating parameters related to the player character such as the HP of the character. The position data 344 is information indicating the current position of the player character in the stage. The host flag 345 is a flag for indicating whether the player is a host player or a guest player. When the host flag 345 is ON, it indicates that the player is a host player. The photographing mode flag 346 is a flag for indicating whether the operation mode is the photographing mode or the character operation mode when the player is a host player. When the photographing mode flag 346 is ON, it indicates that the operation mode is the photographing mode. The timer mode flag 347 is a flag for determining whether or not it is during the timer period as described above in the photographing mode. When the timer mode flag 347 is ON, it indicates that it is during the timer period.

Referring back to FIG. 11, the other character data 315 is data corresponding to player characters operated by the other players in the multiplayer non-competitive game of the exemplary embodiment. The other character data 315 includes information indicating the appearance and equipment of each player character, status information of each player character, information indicating the current position of each player character in the stage, etc.

The virtual camera data 316 is data regarding the virtual camera. This data includes information indicating the position, the orientation, the angle of view, etc., of the virtual camera.

The operation data 317 is data indicating the content of an operation performed by the player on the controller 4. The operation data 317 is data transmitted from the controller 4 to the processor 21 at a predetermined time interval, and includes information indicating pressed states of various buttons, information indicating the content of an input to the analog stick 42, etc.

The received data 318 is various kinds of data received and stored from the game apparatuses 2 of the other players.

The transmission data 319 is data to be transmitted to the game apparatuses 2 of the other players. In the exemplary embodiment, the following information can be included as the transmission data 319. First, common to the host/guest players, information indicating the content of an operation of each player (e.g., the content of the operation data 317) is included. If the player on the transmission side is a host player, information indicating the operation mode (character operation mode/photographing mode) at that time is included. In addition, if the player on the transmission side is a host player, information indicating whether or not it is during photographing with the timer as described above is also included. In the case of the photographing mode, information indicating the above-described angle-of-view lines is also included. The information indicating the angle-of-view lines may be, for example, parameter information of the virtual camera in the host player machine.

The captured image data 320 is data for storing an image captured by the host player. A plurality of captured images can be stored as the captured image data 320.

In addition, although not shown, various kinds of data required for the game processing are also stored in the storage section 22.

Next, the game processing in the exemplary embodiment will be described in detail. In the exemplary embodiment, flowcharts described below are realized by one or more processors reading and executing the above program stored in one or more memories. The flowcharts are merely an example of the processing. Therefore, the order of each process step may be changed as long as the same result is obtained. In addition, the values of variables and thresholds used in determination steps are also merely examples, and other values may be used as necessary.

[Processing Executed in Server 1]

First, processing executed in the server 1 will be described. Although not shown, the following processing is executed in the server 1. First, a process of logging each player into the game according to the exemplary embodiment is executed on the basis of the player database 302. In addition, a process of creating a predetermined room in response to a request from the host player and registering the room in the room management database 303 is performed. Moreover, a process of causing each guest player to participate in the room is also performed in response to a request from the guest player. Then, a process of controlling transmission and reception of various kinds of data regarding the above game processing is also performed between the game apparatuses 2 of the players participating in the room.

[Processing Executed in Game Apparatus 2]

Next, processing executed in the game apparatus 2 will be described. Here, first, processing executed in the host player machine will be described, and then processing executed in each guest player machine will be described. In addition, game processing in the multiple-player non-competitive mode will be mainly described, and the details of other game processing is omitted.

[Processing in Host Player Machine]

Figure 13:
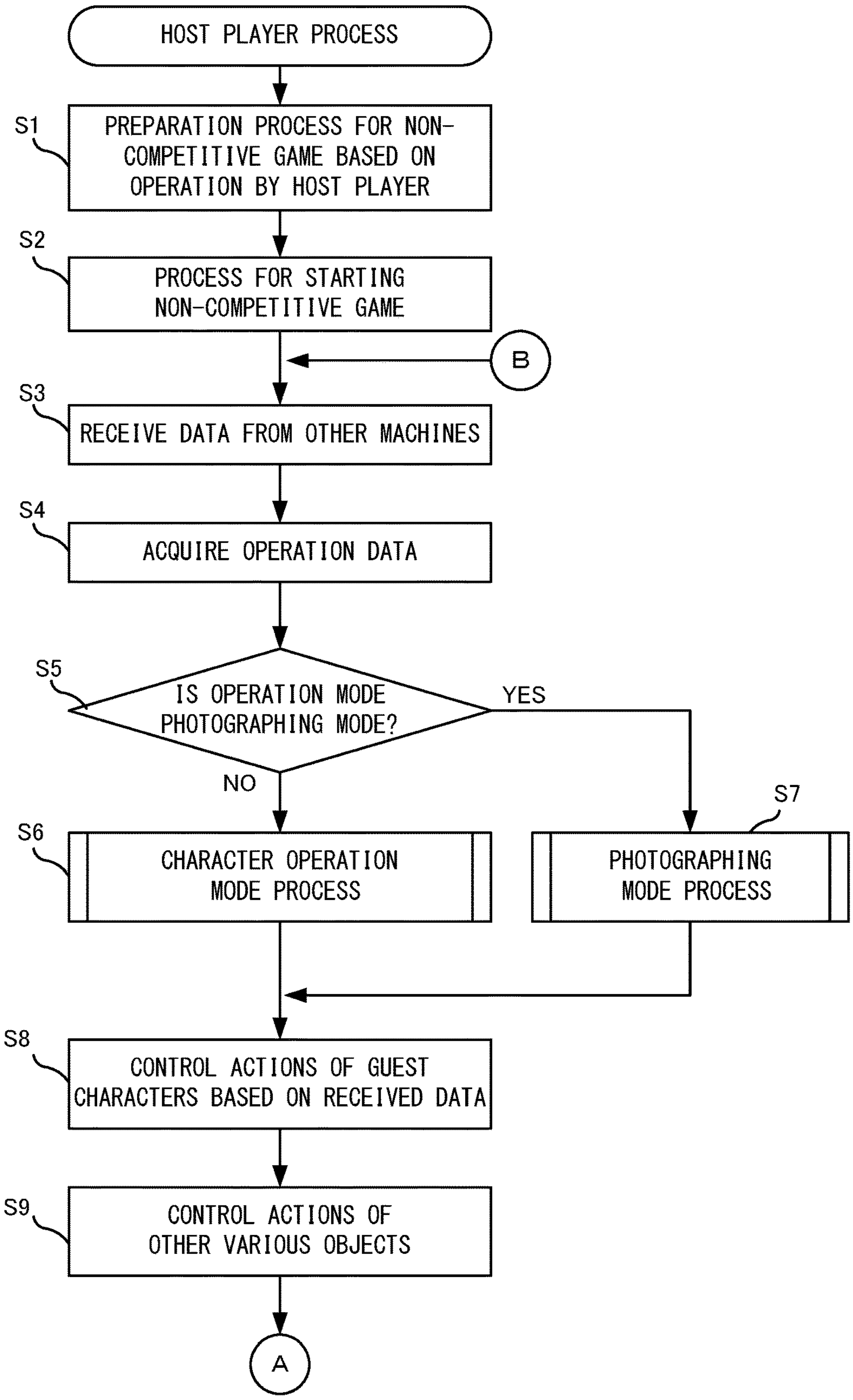
FIG. 13 is a non-limiting example flowchart showing the details of a host player process.
Figure 14:
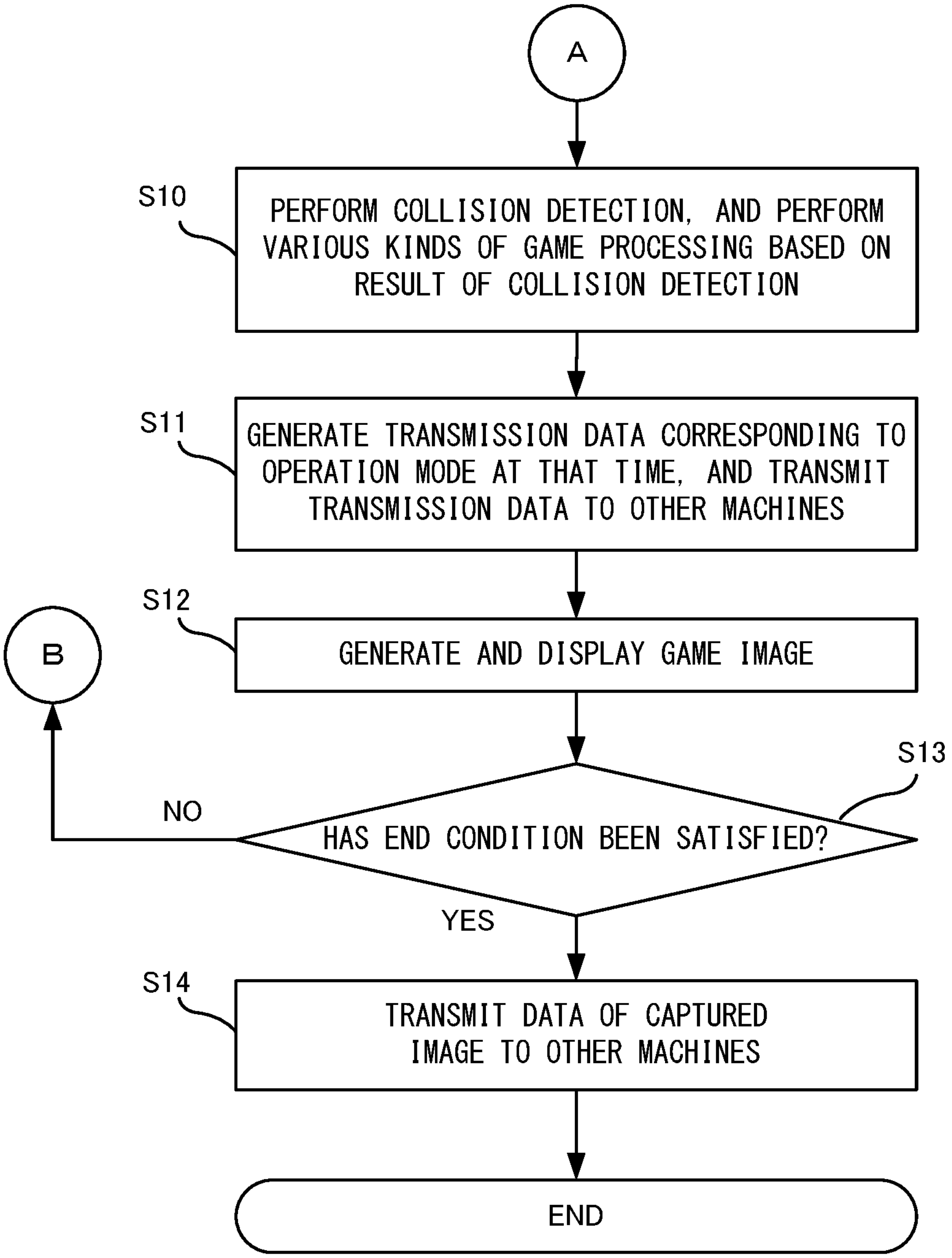
FIG. 14 is a non-limiting example flowchart showing the details of the host player process.

FIG. 13 and FIG. 14 are flowcharts showing the details of a host player process executed in the host player machine. A process loop of steps S3 to S13 shown in FIG. 13 and FIG. 14 is repeated every frame period. In this process loop, data indicating the content of an operation for the player character of each player, etc., is transmitted and received between the host player machine and each guest player machine, and game processing reflecting the content is executed. Therefore, the non-competitive game of the exemplary embodiment is an example of a communication game that is synchronized every frame period.

In FIG. 13, first, in step S1, the processor 21 of the host player machine executes a preparation process for starting the above multiplayer non-competitive game, on the basis of an operation by the host player. Specifically, a process of creating a virtual room is performed on the basis of an operation by the host player. After the room is crated, a process of setting the host flag 345 to be ON is performed. Then, a process of setting for playing the game in the non-competitive mode and setting a stage to be used in the game is performed on the basis of an operation by the host player. An example of an operation for setting for playing the game in the non-competitive mode is an operation for turning on the non-competitive mode by the host player with a toggle button that is displayed on a game rule setting screen and that allows on/off of the non-competitive mode to be switched. Also, a process of dividing the participating players into teams is executed on the basis of an operation by the host player. In addition, various processes for starting the multiplayer non-competitive game are executed. For example, a process of selecting equipment for the host character is executed. When the host player becomes ready to start the game, the host player performs an operation indicating that the preparation has been completed. Then, the processor 21 waits for a notification indicating that preparation has been completed, from each guest player machine.

When notifications indicating preparation has been completed are received from all the guest player machines participating in the game, next, in step S2, the processor 21 performs a process of starting the multiplayer non-competitive game. Specifically, the processor 21 transmits a notification of the start of the multiplayer non-competitive game to each guest player machine. Thereafter, the processor 21 performs a predetermined game start representation, and then places each player character and the virtual camera in the above stage. Then, the processor 21 displays, on the display unit 5, a game image obtained by adding the above normal UI to an image obtained by photographing the stage with the virtual camera.

Next, in step S3, the processor 21 receives the transmission data 319 transmitted from each guest player machine, and stores these data as the received data 318. Next, in step S4, the processor 21 acquires the operation data 317.

Next, in step S5, the processor 21 determines whether or not the current operation mode is the photographing mode, on the basis of the photographing mode flag 346. As a result, if the current operation mode is not the photographing mode (NO in step S5), in step S6, the processor 21 executes a character operation mode process. On the other hand, if the current operation mode is the photographing mode (YES in step S5), in step S7, the processor 21 executes a photographing mode process. Hereinafter, these two processes will be sequentially described.

[Character Operation Mode Process]

Figure 15:
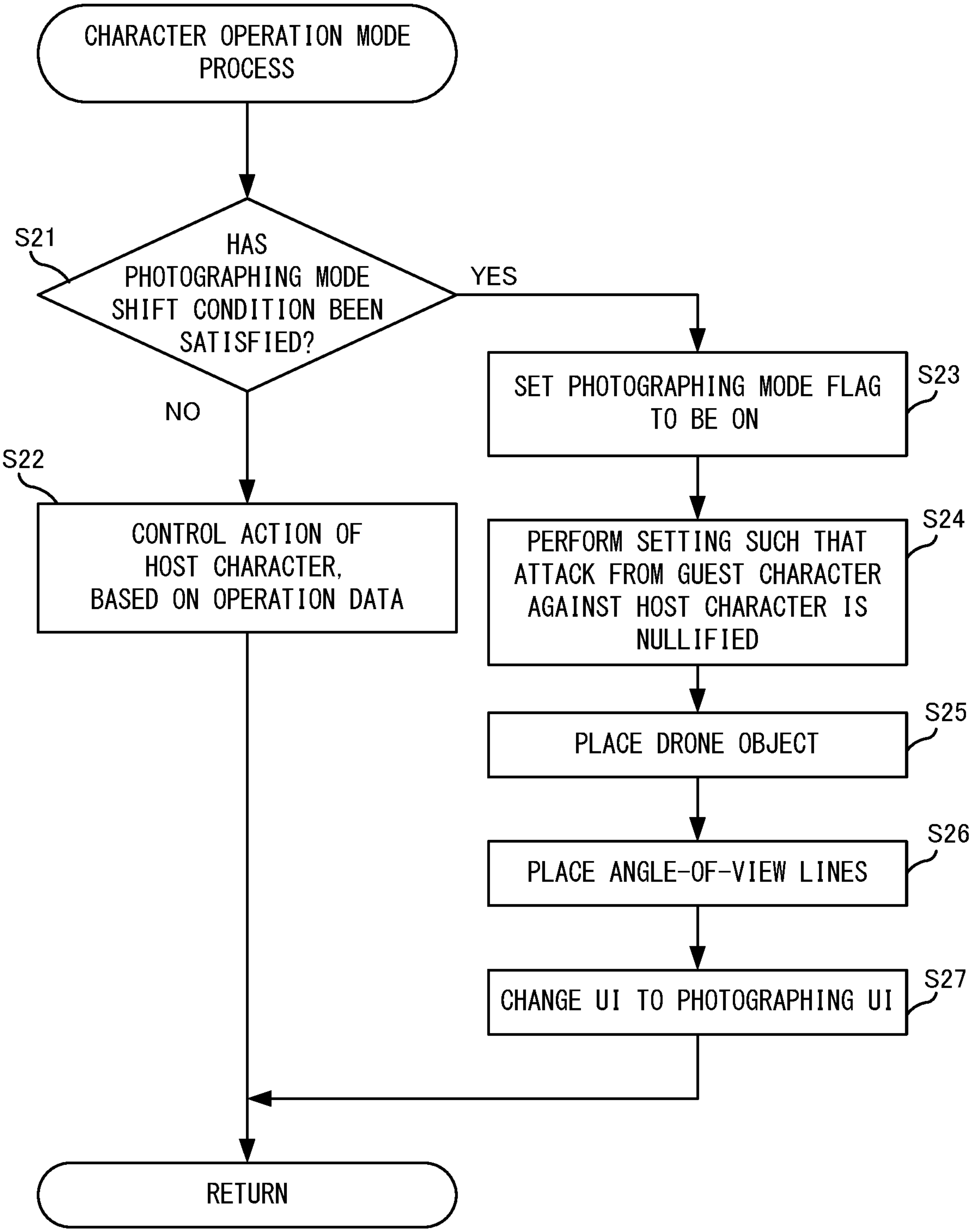
FIG. 15 is a non-limiting example flowchart showing the details of a character operation mode process.

FIG. 15 is a flowchart showing the details of the character operation mode process. In FIG. 15, first, in step S21, the processor 21 determines whether or not a photographing mode shift condition has been satisfied. In the exemplary embodiment, when the current situation is a situation where the host character can shift to the photographing mode, or when the minus button is pressed, it is determined that the photographing mode shift condition has been satisfied. The situation where the host character can shift to the photographing mode is a situation where the state of the host character is stable. For example, when the host character is performing a special attack action (e.g., activating a special technique), the state of the host character is treated as unstable during that motion. As another example of the shift condition, for example, when the host character moves to a position near a "photographing spot" provided in the stage, it may be determined that this condition has been satisfied.

As a result of the determination, if the photographing mode shift condition has not been satisfied (NO in step S21), in step S22, the processor 21 controls the action of the host character on the basis of the operation data 317. That is, the processor 21 moves the host character or causes the host character to perform a predetermined attack action on the basis of the operation data 317. In addition, along with this, the contents of the position data 344 and the status data 343 are also updated as appropriate. Then, the character operation mode process ends.

On the other hand, if the photographing mode shift condition has been satisfied (YES in step S21), a preparation process for shifting to the photographing mode is performed. Specifically, first, in step S23, the processor 21 sets the photographing mode flag 346 to be ON. Next, in step S24, the processor 21 performs setting such that an attack of the guest character against the host character is nullified. In the exemplary embodiment, a process of updating the equipment data 342 such that the host character is equipped with the above-described "special armor", is executed. The "special armor" may be an invisible object or a visible object.

Next, in step S25, the processor 21 places the above-described drone object at the position of the virtual camera. In the exemplary embodiment, an example in which the position of the virtual camera and the position of the drone object are caused to coincide with each other, has been described. However, in another exemplary embodiment, these positions do not necessarily have to be caused to coincide with each other, and may be slightly displaced relative to each other as long as it can be recognized that the virtual camera is present substantially at the position of the drone object.

Next, in step S26, the processor 21 performs setting such that the above-described angle-of-view lines are displayed, on the basis of setting of the angle of view of the virtual camera. In the exemplary embodiment, angle-of-view line objects are placed.

Next, in step S27, the processor 21 changes the UI to the photographing UI shown in FIG. 5 above. Then, the character operation mode process ends.

[Photographing Mode Process]

Figure 16:
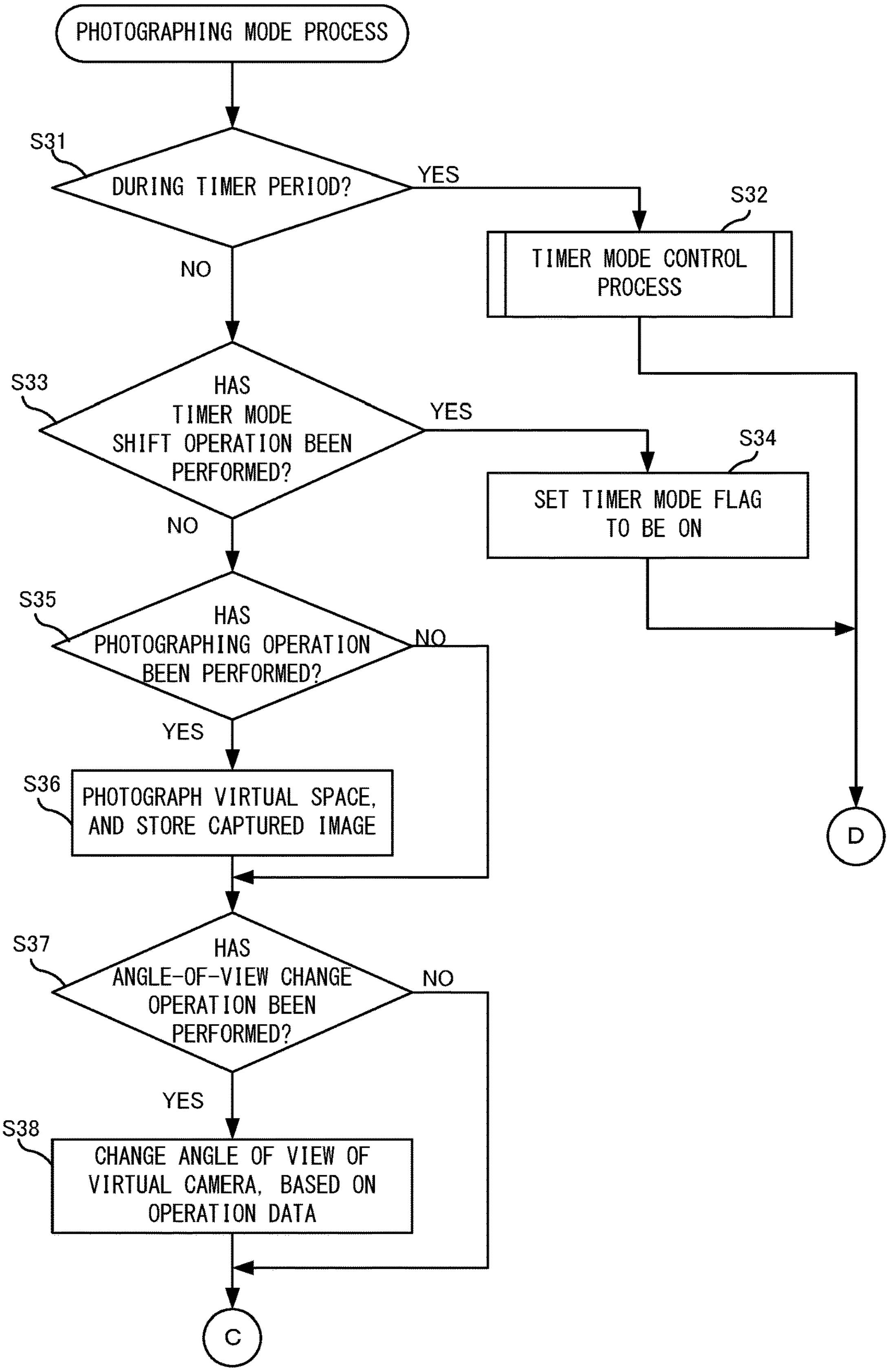
FIG. 16 is a non-limiting example flowchart showing the details of a photographing mode process.
Figure 17:
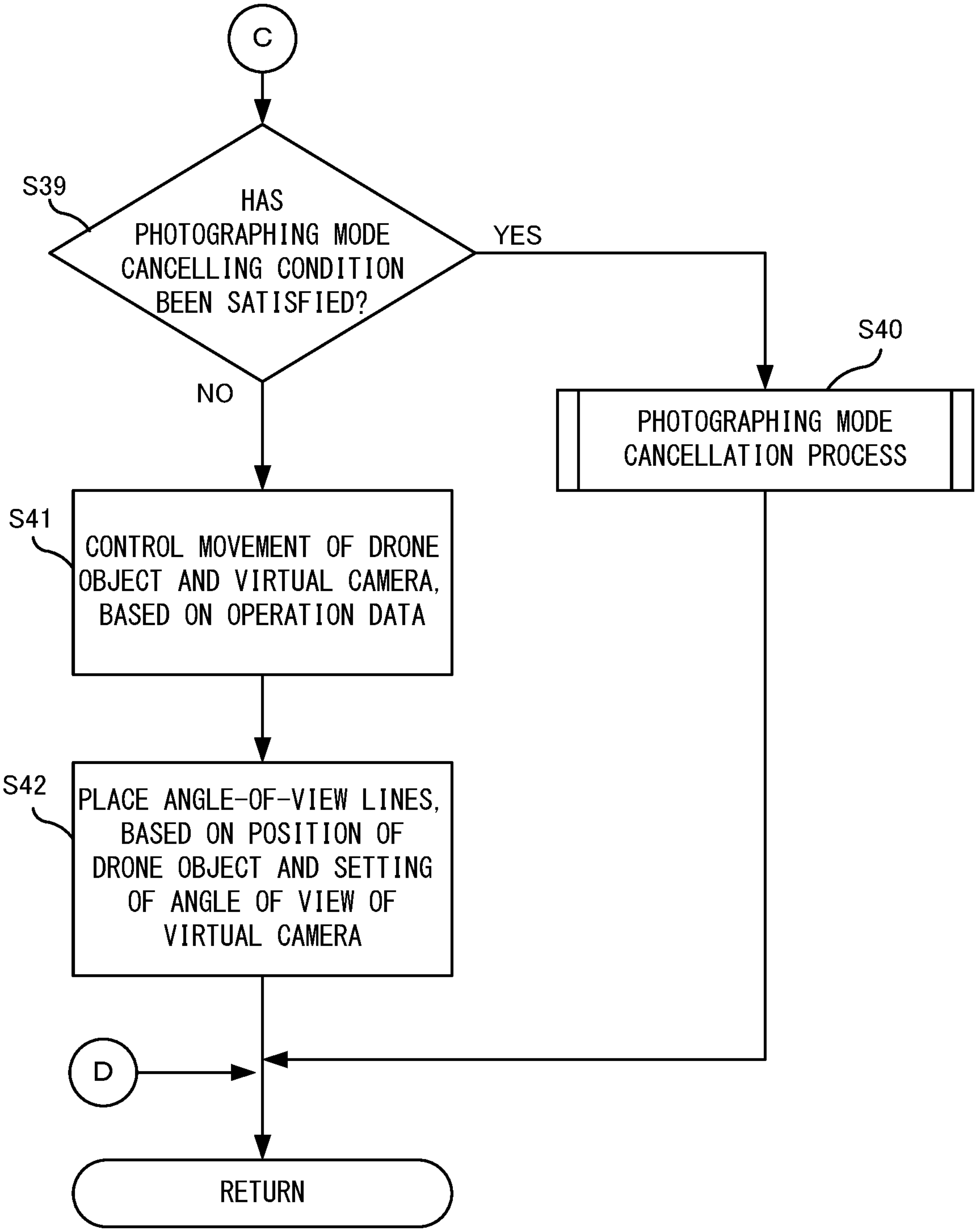
FIG. 17 is a non-limiting example flowchart showing the details of the photographing mode process.

Next, the photographing mode process in step S7 above will be described. FIG. 16 and FIG. 17 are flowcharts showing the details of the photographing mode process. In FIG. 16, first, in step S31, the processor 21 determines whether or not it is currently during the timer period, on the basis of the above timer mode flag 347. If it is not during the timer period (NO in step S31), in step S33, the processor 21 determines whether or not an operation for starting the count of the timer (timer mode shift operation) has been performed, on the basis of the operation data 317. In the exemplary embodiment, the timer time is fixed at 10 seconds, and the count of the timer for 10 seconds is started by pressing a predetermined button. As a result of the determination, if the operation for starting the count of the timer has been performed (YES in step S33), in step S34, the processor 21 sets the timer mode flag 347 to be ON. Then, the processor 21 ends the photographing mode process.

On the other hand, if the operation for starting the count of the timer has not been performed (NO in step S33), in step S35, the processor 21 determines whether or not a photographing operation has been performed, on the basis of the operation data 317. If the photographing operation has been performed (YES in step S35), in step S36, the processor 21 stores an image of the virtual space captured with the virtual camera at that time, as the captured image data 320. Then, the processor 21 advances the processing to step S37. On the other hand, as a result of the determination, if the photographing operation has not been performed (NO in step S35), the processor 21 advances the processing to step S37 without performing the process in step S36 above.

Next, in step S37, the processor 21 determines whether or not an operation for changing the angle of view of the virtual camera (angle-of-view change operation) has been performed, on the basis of the operation data 317. The angle-of-view change operation is, for example, an operation for zooming in or zooming out, etc. As a result of the determination, if the angle-of-view change operation has been performed (YES in step S37), in step S38, the processor 21 updates the content of the virtual camera data 316 on the basis of the operation data 317. Accordingly, the angle of view of the virtual camera is changed. Then, the processor 21 advances the processing to step S39. On the other hand, as a result of the determination, if the angle-of-view change operation has not been performed (NO in step S37), the processor 21 advances the processing to step S39 without performing the process in step S38 above.

Next, in step S39 in FIG. 17, the processor 21 determines whether or not a condition for cancelling the photographing mode has been satisfied. This condition is that the host player performs a photographing mode cancellation operation, in this example, the host player presses the minus button, or that the above exit condition, such as falling off the stage, is satisfied. As a result of the determination, if the photographing mode cancelling condition has not been satisfied (NO in step S39), in step S41, the processor 21 controls the movement or orientation of the drone object and the virtual camera on the basis of the operation data 317. In this case, the range of movement of the drone object may be limited to be within a predetermined range centered on the host character. If the drone object is allowed to move freely, photographing is enabled from various positions, but there is a possibility that the host player cannot grasp the current position of the drone object. Therefore, by limiting the range of movement of the drone object such that the drone object does not move excessively far from the host character, it is made easier for the host player to grasp the position of the drone object using the position of the host character as a guide.

Next, in step S42, on the basis of the position of the drone object (virtual camera) and the angle of view of the virtual camera, the processor 21 generates the above-described angle-of-view lines and places the angle-of-view lines in the virtual space. Then, the processor 21 ends the photographing mode process.

[Photographing Mode Cancellation Process]

Figure 18:
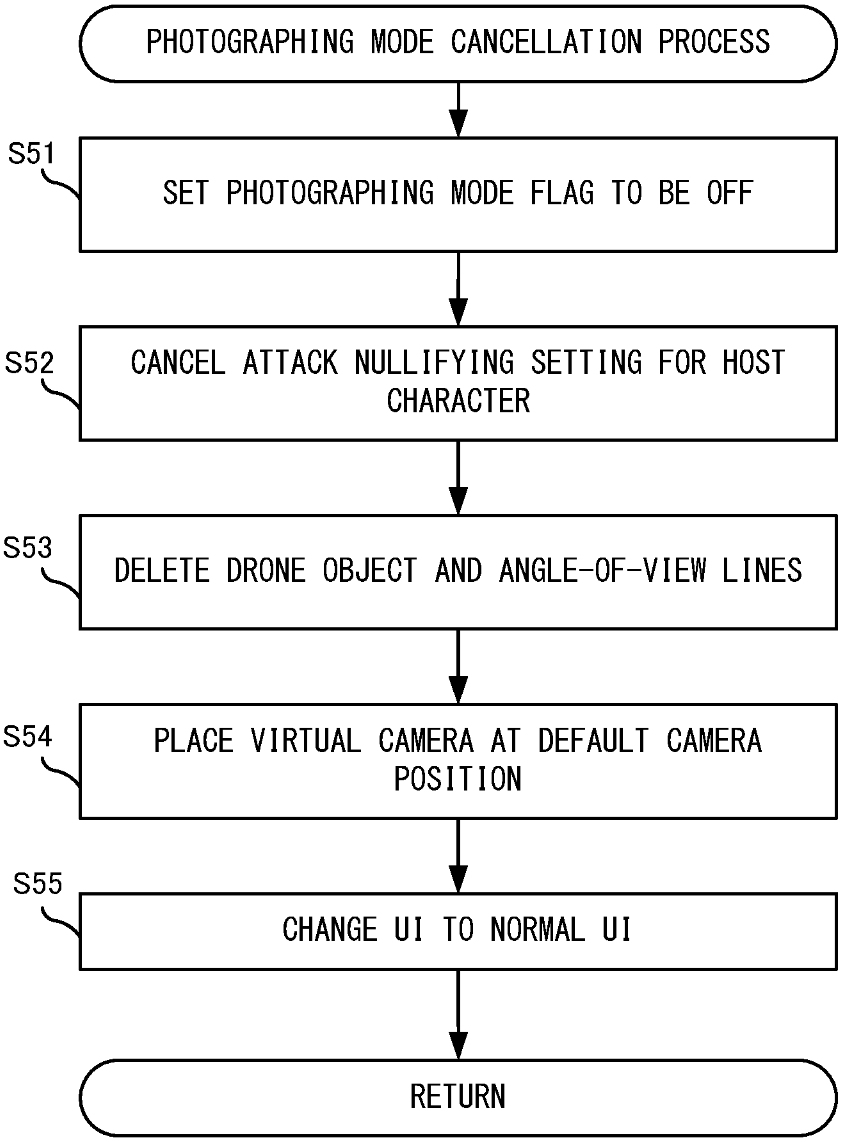
FIG. 18 is a non-limiting example flowchart showing the details of a photographing mode cancellation process.

On the other hand, as a result of the determination in step S39 above, if the photographing mode cancelling condition has been satisfied (YES in step S39), in step S40, the processor 21 executes a photographing mode cancellation process. FIG. 18 is a flowchart showing the details of the photographing mode cancellation process. In FIG. 18, first, in step S51, the processor 21 sets the photographing mode flag 346 to be OFF.

Next, in step S52, the processor 21 cancels the attack nullifying setting which is performed for the host character in step S24 above. Specifically, the host character is set to be in a state where the host character is not equipped with the above "special armor".

Next, in step S53, the processor 21 deletes the drone object and the angle-of-view lines. Subsequently, in step S54, the processor 21 returns the position of the virtual camera to the above default camera position. Furthermore, in step S55, the processor 21 changes the UI from the photographing UI to the normal UI. Then, the photographing mode cancellation process ends.

As for the process in step S54 above, in another exemplary embodiment, when returning the virtual camera to the default camera position, the virtual camera may not necessarily be returned thereto in an instant, but the position of the virtual camera may be changed over several frames with a predetermined screen representation performed therebetween. For example, a representation of wiping the screen may be performed, and then a game image captured from the default camera position may be displayed. By switching the viewpoint over a short time as described above without instantly switching the viewpoint, it is made easier for the host player to recognize the operation mode has returned from the photographing mode to the character operation mode. In addition, the host player can also be allowed to perform preparation, etc., for an operation for shifting to the character operation mode.

[Processing During Timer Period]

Figure 19:
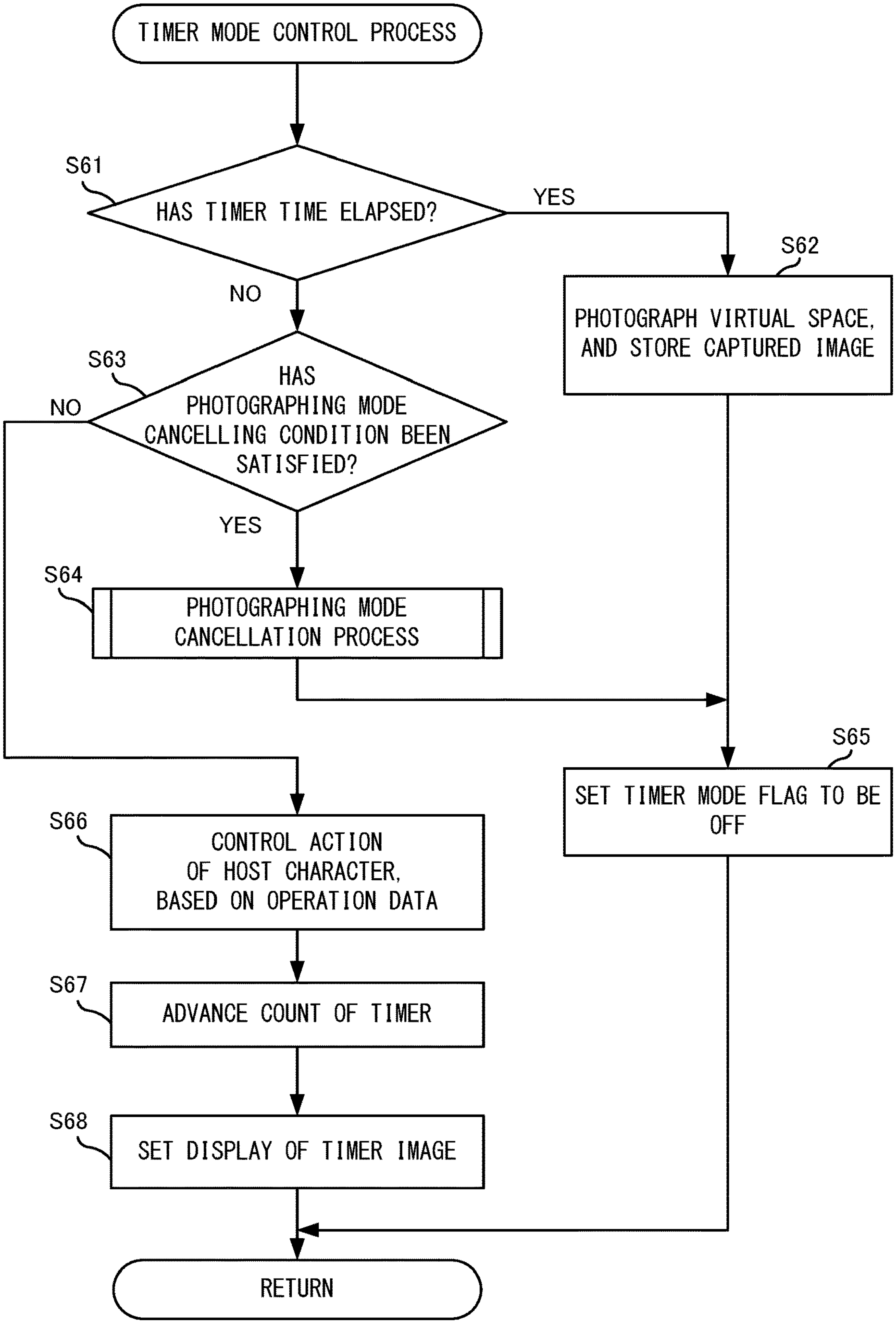
FIG. 19 is a non-limiting example flowchart showing the details of a timer mode control process.

Referring back to FIG. 16, processing in the case where, as a result of the determination in step S31 above, it is during the timer period (YES in step S31), will be described next. In this case, in step S32, the processor 21 executes a timer mode control process. FIG. 19 is a flowchart showing the details of the timer mode control process. First, in step S61, the processor 21 determines whether or not a time (in this example, 10 seconds from the start of count) set as a timer has elapsed. As a result of the determination, if the time has not elapsed (NO in step S61), in step S63, the processor 21 determines whether or not the above-described photographing mode cancelling condition has been satisfied. As a result, if the photographing mode cancelling condition has been satisfied (YES in step S63), in step S64, the processor 21 executes a photographing mode cancellation process. This process is the same as in step S40 above (process shown in FIG. 18), and thus the description thereof is omitted.

Next, in step S65, the processor 21 sets the timer mode flag 347 to be OFF. Furthermore, the processor 21 also performs a process of deleting the timer image. Then, the processor 21 ends the timer mode control process. That is, even during the timer period, if a photographing end condition has been satisfied due to the host character falling off the stage, or the like, the photographing mode is forcibly ended at that time.

On the other hand, as a result of the determination in step S63 above, if the photographing mode cancelling condition has not been satisfied (NO in step S63), in step S66, the processor 21 controls the action of the host character on the basis of the operation data 317. That is, during the timer period, the object to be operated is temporarily switched from the drone object to the host character. In this case, the host character can also perform attack actions against the guest characters. That is, during the timer period, the host character can also attack the guest characters in a state of being equipped with the above "special armor".

Next, in step S67, the processor 21 advances the count of the timer. Subsequently, in step S68, the processor 21 performs setting such that the above timer image is displayed. Then, the processor 21 ends the timer mode control process.

On the other hand, as a result of the determination in step S61 above, if the time set as a timer has elapsed (YES in step S61), in step S62, the processor 21 captures an image of the virtual space with the virtual camera, and stores the captured image as the captured image data 320. Then, the timer mode flag 347 is set to be OFF in the process in step S65 above, and the timer mode control process ends.

Referring back to FIG. 16, when the timer mode control process ends, the photographing mode process ends.

[Action Control of Other Characters]

Referring back to FIG. 13, when the above character operation mode process or photographing mode process ends, next, in step S8, the processor 21 controls the action of each guest character on the basis of the received data 318. That is, movement and attack action are controlled for the guest characters.

Next, in step S9, the processor 21 controls the actions of various objects other than the player characters. For example, the actions of various gimmicks on the stage such as a "moving floor" are controlled.

[Various Kinds of Game Processing]

Next, in step S10 in FIG. 14, the processor 21 performs collision detection of each object. Furthermore, the processor 21 executes various kinds of game processing corresponding to the result of the collision detection. For example, the following processing is executed as the game processing.

[Processing when Host Character is Hit]

First, if a bullet fired by an attack action of the guest character collides with (hits) the host character, the host character is caused to perform an action that is to be performed when receiving an attack. In this case, the action to be performed by the host character depends on whether or not the host character is equipped with the above "special armor". If the host character is not equipped with the "special armor", a process of moving the host character for a predetermined distance in a predetermined direction based on a direction in which the host character is attacked, while causing the host character to perform a motion of receiving an attack (hereinafter, referred to as hit motion), is performed. In addition, a process of giving a predetermined damage to the host character, for example, a process of decreasing the HP of the host character, is also performed. On the other hand, if the host character is equipped with the "special armor", a process of nullifying the received attack is executed. Specifically, in the exemplary embodiment, a process of causing the received bullet to disappear at that spot is performed. As a result, movement of the host character due to the attack does not occur, the hit motion is not performed, and no damage occurs. Here, the case of "being hit by a bullet" has been described, but if the host character receives an attack other than shooting, such as a blow, a process of nullifying this attack is performed. For example, a process of causing the guest character that has performed the blow attack to perform a motion of bending backward or being repulsed, or the like is performed. As for the specific process of nullifying the attack, the above processes are merely examples, and another method or representation may be used.

[Processing when Guest Character is Hit]

When each guest character is hit by a bullet or receives another type of attack, a process of moving the guest character with a hit motion or giving a predetermined damage to the guest character is performed on the basis of the content of the hit or the attack.

[Process of Movement by Stage Gimmick, Etc.]

For example, movement control or the like based on stage gimmicks such as a moving floor is performed for each player character. As a result, the player character may fall off the stage.

[Determination of Exit Condition]

Whether or not the exit condition has been satisfied for each player character is also determined. Specifically, if the HP reaches 0 as a result of receiving the above various attacks, it is determined that the exit condition has been satisfied, and a process of respawning the character is executed. As another exit condition, when the player character falls off the stage, it is determined that the exit condition has been satisfied, and a process of respawning the player character is executed. For example, after this, setting is performed such that a representation of the respawn is displayed over several seconds. Even if the host character is equipped with the "special armor" as described above, the host character can exit by falling off the stage.

In addition, various kinds of game processing other than the above can be executed as necessary.

[Data Transmission]

Next, in step S11, the processor 21 generates the transmission data 319 corresponding to the operation mode of the host character at that time. Then, the processor 21 transmits the transmission data 319 to other game apparatuses 2 identified on the basis of the participation room data 313. Specifically, when the operation mode is the character operation mode, the processor 21 generates the transmission data 319 including information indicating the content of an operation by the host player and information indicating that the operation mode is the "character operation mode". On the other hand, when the operation mode is the "photographing mode", the processor 21 generates the transmission data 319 including the following information in addition to information indicating the content of an operation by the host player. That is, the transmission data 319 including information indicating that the operation mode is the "photographing mode", information indicating whether or not it is "during the timer period", and information regarding the above angle-of-view lines, is generated. These pieces of information are generated on the basis of the operation data 317, the photographing mode flag 346, the timer mode flag 347, and the virtual camera data 316. Then, the processor 21 transmits the generated transmission data 319 to the guest player machines.

Next, in step S12, the processor 21 performs a process of displaying a game image reflecting the above processing.

Next, in step S13, the processor 21 determines whether or not an end condition for the game processing for the multiple-player non-competitive mode has been satisfied. Specifically, when the time limit has elapsed, or when an explicit operation for ending the game has been performed by the player, it is determined that the end condition has been satisfied. As a result of the determination, if the end condition has not yet been satisfied (NO in step S13), the processor 21 returns to step S3 above and repeats the processing.

On the other hand, if the end condition has been satisfied (YES in step S13), in step S14, the processor 21 transmits the data of the image captured through the game processing for the current multiple-player non-competitive mode. Then, the processor 21 ends the host player process.

[Processing in Guest Player Machine]

Figure 20:
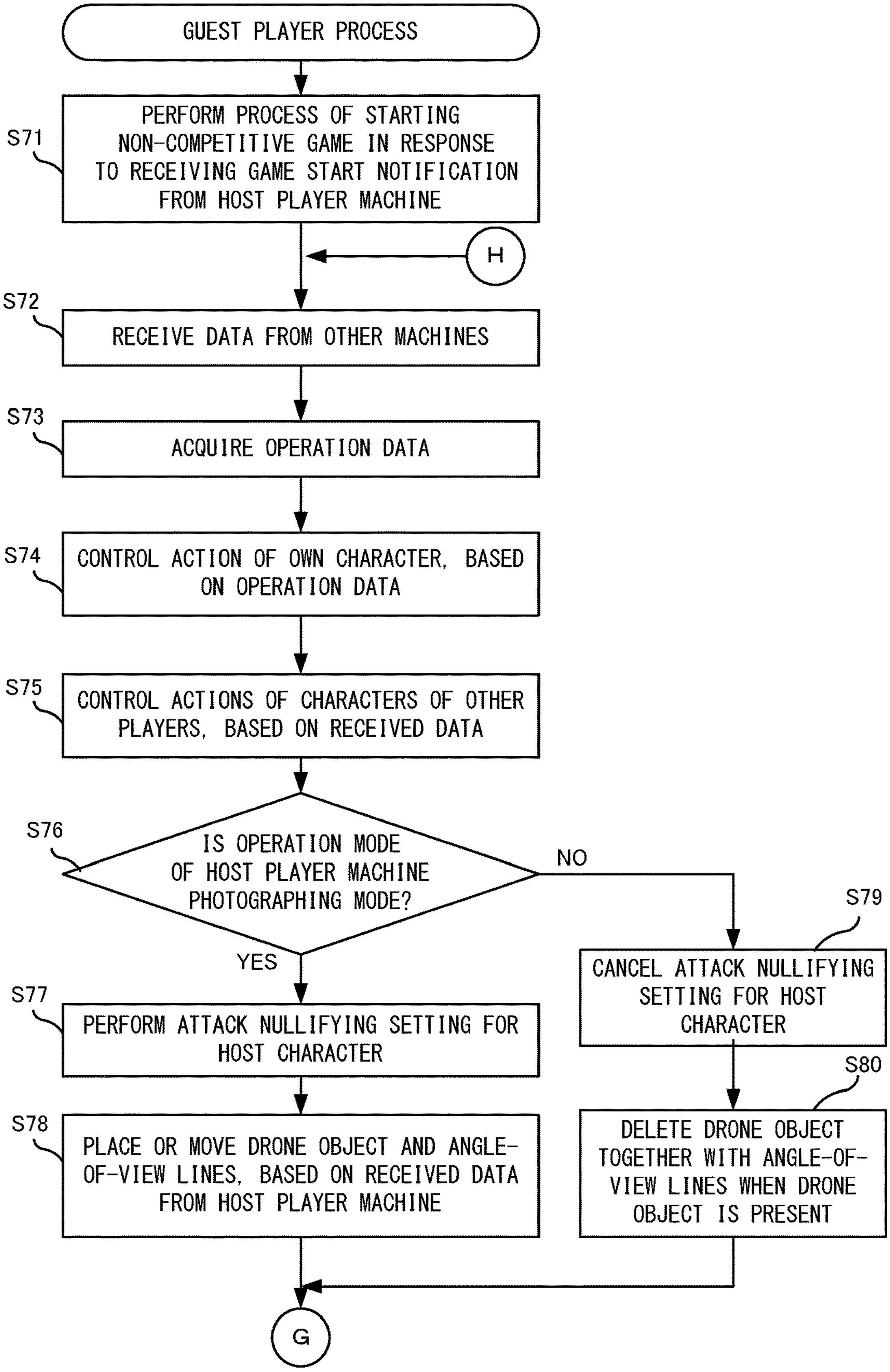
FIG. 20 is a non-limiting example flowchart showing the details of a guest player process.
Figure 21:
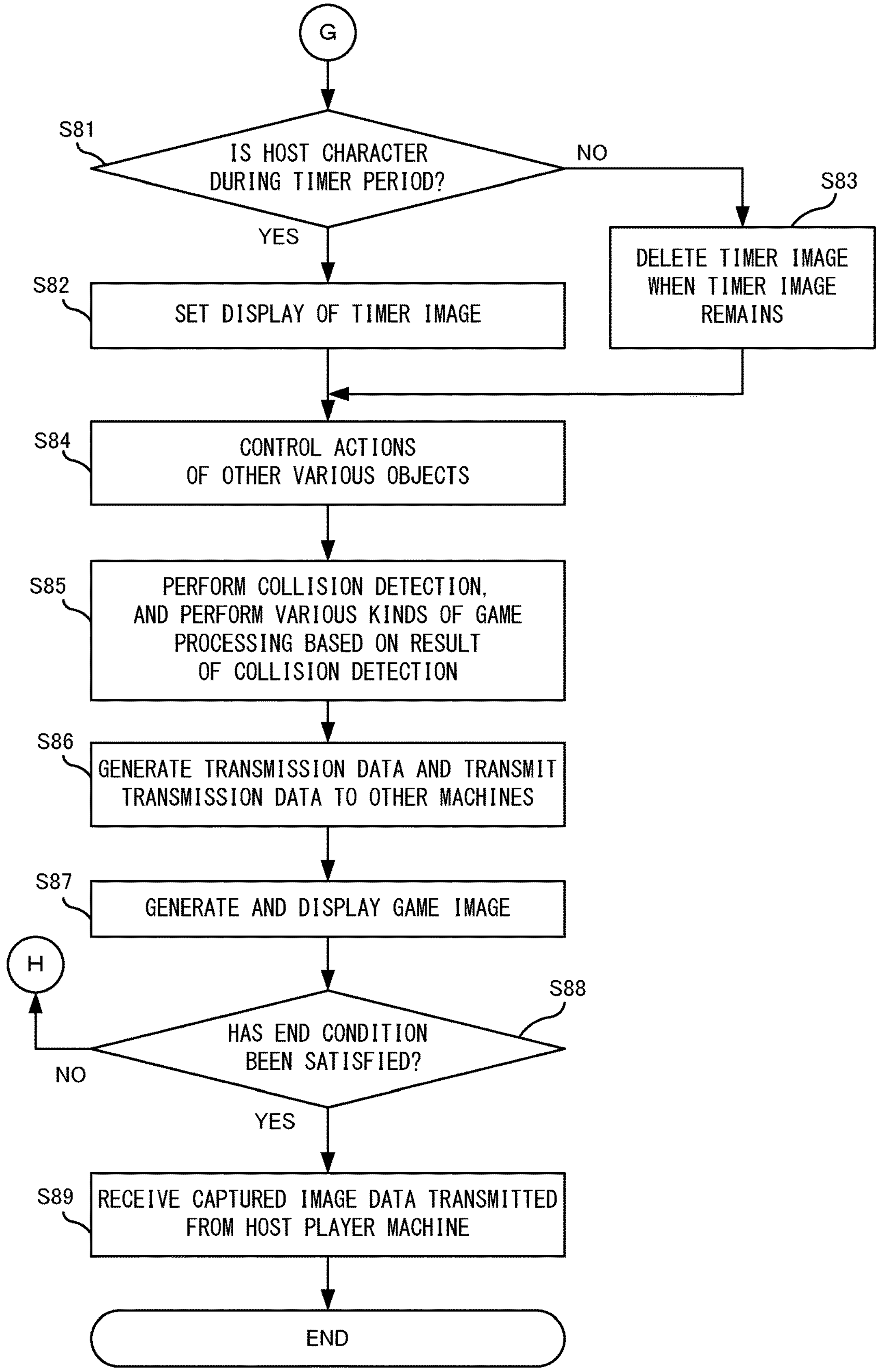
FIG. 21 is a non-limiting example flowchart showing the details of the guest player process.

Next, a guest player process executed in each guest player machine will be described. FIG. 20 and FIG. 21 are flowcharts showing the details of the guest player process. A process loop of steps S72 to S88 in FIG. 20 and FIG. 21 is repeated every frame period. It is assumed that the guest player has already entered the room and prepared for the start of the game prior to the execution of this process. Then, it is assumed that the guest player has performed a preparation completion operation and is waiting for the game to start.

In FIG. 20, first, in step S71, the processor 21 of the guest player machine performs a process of starting the multiplayer non-competitive game in response to receiving a game start notification from the host player machine. Specifically, the processor 21 performs a predetermined game start representation and then places each player character and the virtual camera in the above stage. Then, the processor 21 displays, on the display unit 5, a game image obtained by adding the above normal UI to an image of the stage captured with the virtual camera. In the guest player machine, the above host flag 345 is set to be OFF.

Next, in step S72, the processor 21 receives data transmitted from the host player machine and other guest player machines, and stores the received data as the received data 318. Next, in step S73, the processor 21 acquires the operation data 317.

Next, in step S74, the processor 21 controls the action of the guest character on the basis of the operation data 517.

Next, in step S75, the processor 21 controls the actions of the host character and the other guest characters on the basis of the received data 318.

Next, in step S76, the processor 21 determines whether or not the operation mode of the host player machine is the "photographing mode", on the basis of the data received from the host player machine. As a result of the determination, if the operation mode is the photographing mode (YES in step S76), in step S77, the processor 21 performs attack nullifying setting for the host character. In this example, the processor 21 performs a process of equipping the host character with the above "special armor". If the host character has already been equipped with the "special armor", this process may be skipped.

Next, in step S78, the processor 21 places the drone object or controls the movement of the drone object on the basis of the data received from the host player machine. Furthermore, the processor 21 places or moves the above angle-of-view lines on the basis of the received data. Then, the processor 21 advances the processing to step S81 described later.

On the other hand, as a result of the determination in step S76 above, if the operation mode is not the "photographing mode" (NO in step S76), in step S79, the processor 21 cancels the attack nullifying setting when the attack nullifying setting has been performed for the host character. In this example, a process of removing the "special armor" from the host character is performed.

Next, in step S80, if the drone object is present in the virtual space, the processor 21 deletes the drone object and the angle-of-view lines. Then, the processor 21 advances the processing to step S81.

Next, in step S81 in FIG. 21, the processor 21 determines whether or not the host player machine is currently during the above timer period, on the basis of the data received from the host player machine. As a result of the determination, if the host player machine is during the timer period (YES in step S81), in step S82, the processor 21 performs setting for displaying a timer image as shown in FIG. 9 above. Specifically, if it is currently immediately after the start of count of the timer and the timer image is not displayed, display setting is performed such that the timer image is displayed as part of the UI. If setting of displaying the timer image has been performed, the display content of the timer image is changed in accordance with the elapsed time after the setting of displaying the timer image is performed. Then, the processor 21 advances the processing step S84.

As for the display of the timer image, the example in which the guest player machine counts the elapsed time after the setting of displaying the timer image is performed, has been described in this example. In the regard, in another exemplary embodiment, information indicating the remaining time of the timer may be included in the transmission data 319 in the host player machine. Then, the guest player machine may change the display content of the timer image on the basis of this information.

On the other hand, as a result of the determination in step S81 above, if the host player machine is not during the timer period (NO in step S81), in step S83, when the setting of displaying the timer image has been performed, the processor 21 performs setting such that the timer image is not displayed. Then, the processor 21 advances the processing to step S84.

Next, in step S84, the processor 21 controls the actions of various objects other than the player characters. Subsequently, in step S85, the processor 21 performs collision detection of each object. Furthermore, the processor 21 executes various kinds of game processing corresponding to the result of the collision detection. The processes in step S84 and step S85 are the same as in step S9 in FIG. 13 and step S10 in FIG. 14 above. Therefore, although not described in detail, a process of nullifying an attack against the host character equipped with the above "special armor" is also performed in the guest player machine.

Next, in step S86, the processor 21 generates the transmission data 319. Then, the processor 21 transmits the transmission data 319 to the other game apparatuses. This process is a process related to the guest player, and thus the transmission data 319 includes data indicating the content of an operation by the guest player.

Next, in step S87, the processor 21 performs a process of displaying a game image reflecting the above processing.

Next, in step S88, the processor 21 determines whether or not an end condition for the game processing for the multiple-player non-competitive mode has been satisfied. Specifically, when the time limit has elapsed, or when an explicit operation for ending the game has been performed by the player, it is determined that the end condition has been satisfied. As a result of the determination, if the end condition has not yet been satisfied (NO in step S88), the processor 21 returns to step S72 above and repeats the processing.

On the other hand, if the end condition has been satisfied (YES in step S88), in step S89, the processor 21 receives the captured image data 320 transmitted from the host player machine, and stores the captured image data 320 in the storage section 22. Then, the processor 21 ends the guest player process.

The above captured image is presented to each player in a predetermined manner after the end of the game in the multiple-player non-competitive mode. For example, when the game in the multiple-player non-competitive mode ends and each player returns to the room, if there is a captured image, a wall or board with a photo on it is displayed in the room. Then, when each player character is moved in front of the wall or board and each player presses a predetermined button, a screen of a captured image list is displayed. Each player can select a certain captured image and download the captured image to their own game apparatus 2 as necessary.

This is the end of the detailed description of the game processing of the exemplary embodiment.

As described above, in the exemplary embodiment, when a predetermined player performs photographing during the execution of the game in which multiple players participate, an attack from the character of any other player against the character of the player who performs this photographing is nullified. Accordingly, the character of the player who performs this photographing can be prevented from satisfying the exit condition due to the attack, thereby allowing the player to smoothly perform photographing work.

Modifications

The above photographing mode can also be used in the above one-player non-competitive mode. Here, in the game, when the player shifts to the photographing mode in the one-player non-competitive mode, the passage of the time in the game may be stopped except for the player character. That is, the actions of all objects in the virtual space are stopped. On the other hand, in the "multiple-player non-competitive mode", even when the host player shifts to the photographing mode, such time stop is not performed. In the multiple-player non-competitive mode, if the time in the game is stopped each time the host player shifts to the photographing mode, the guest players may be confused, so that time stop is not performed in the multiple-player non-competitive mode. In the "one-player non-competitive mode", there is only one player, and thus stopping time does not affect other players. When it is desired to capture a specific scene (moment), it may be convenient to stop the time in the game, and thus in the "one-player non-competitive mode", the time in the game may be stopped when the player shifts to the photographing mode.

As for the above attack nullifying setting for the host character, in the above embodiment, the example in which the attack nullifying setting is performed for the purpose of preventing the host character from exiting due to an attack from the guest character, has been described. In this regard, in another exemplary embodiment, in addition to exiting, some disadvantages (other than exiting) may be generally prevented from occurring for the host character due to attacks. For example, if the game is a game configured such that even if the HP of the host character reaches 0, the host character is merely temporarily immobilized at that spot and is not caused to exit the stage, setting may be performed such that the HP is prevented from reaching 0.

The method for transmitting an image captured by the host player to the guest players is not limited to the method described above, and the image may be transmitted by any method. For example, each time the host player performs photographing, a captured image may be immediately transmitted to the guest players. In addition, for example, after the end of the multiplayer non-competitive game, a predetermined editing screen may be displayed on the host player machine, and the host player may be allowed to select a captured image to be transmitted to the guest players. The host player may be allowed to select a destination of the transmission. That is, the host player may be allowed to individually select a destination of transmission and a captured image to be transmitted. In addition, before a captured image is transmitted to the guest players, the host player may be allowed to perform simple editing and processing on the captured image. For example, the host player may be allowed to add a predetermined icon or frame to the captured image or to process the captured image into a sepia-tone or monochrome image or the like.

In the above embodiment, the case where only the host player can shift to the photographing mode has been described as an example. In another exemplary embodiment, the guest players may be allowed to shift to the photographing mode. In this case, the number of players that can shift to the photographing mode at the same time may be one. That is, only one of the participants may be allowed to shift to the photographing mode and perform photographing.

In the above embodiment, the example in which the data transmitted from the host player machine to each guest player machine for synchronization is different between the case of the character operation mode and the case of the photographing mode, has been described. In another exemplary embodiment, in both modes, as data to be transmitted from the host player machine, only data regarding an operation performed by the host player and data for transmission/reception control may be transmitted. In this case, the guest player machine may determine whether the host player has performed an operation for switching the operation mode. If an operation for switching to the photographing mode has been performed, the above attack nullifying setting may be performed for the host character.

In the above embodiment, the case where the host player process and the guest player process themselves are executed by a single information processing apparatus has been described. This information processing apparatus may include a plurality of storages and a plurality of processors. The above processes may be shared using the respective storages and the respective processors. In addition, in another exemplary embodiment, the above processes may be performed in an information processing system that includes a plurality of information processing terminals. For example, in an information processing system that includes a terminal side apparatus and a server side apparatus capable of communicating with the terminal side apparatus via a network, a part of the processes in the host player process and the guest player process may be performed by the server side apparatus. Alternatively, in an information processing system that includes a terminal side apparatus and a server side apparatus capable of communicating with the terminal side apparatus via a network, a main process of the processes may be performed by the server side apparatus, and a part of the processes may be performed by the terminal side apparatus. Still alternatively, in the information processing system, a server side system may include a plurality of information processing terminals, and a process to be performed in the server side system may be divided and performed by the plurality of information processing terminals. In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. One or more computer-readable non-transitory storage media having stored therein instructions that, when executed by a computer of a first terminal capable of communicating with at least one second terminal, cause the computer of the first terminal to:

execute a game in which a game situation is synchronized with the second terminal;

when an operation mode of a first player of the first terminal is a character operation mode in the game, cause a first character in a virtual space to perform at least a movement action or an attack action in a game stage which is the virtual space, on the basis of an operation input by the first player, cause a second character in the virtual space to perform at least a movement action or an attack action in the game stage, on the basis of communication data received from the second terminal, cause the first character to at least temporarily exit the game stage when an exit condition for the first character is satisfied due to the attack action by the second character, and switch the operation mode of the first player from the character operation mode to a photographing mode when an operation mode change condition for the first player is satisfied in the game; and when the operation mode of the first player is the photographing mode in the game, control at least any one of a position, an orientation, and an angle of view of a photographing virtual camera for photographing the virtual space, on the basis of an operation input by the first player, store an image based on the photographing virtual camera in a memory in accordance with an image storing operation input by the first player, and nullify an attack of the second character against the first character such that the exit condition for the first character is not satisfied due to the attack action of the second character, or nullify exit of the first character from the game stage due to the attack action.

2. The one or more storage media according to claim 1, wherein, when the operation mode of the first player is the photographing mode, control of the first character based on an operation input by the first player is restricted.

3. The one or more storage media according to claim 2, wherein the instructions further cause the computer of the first terminal to, when the operation mode of the first player is the photographing mode, start count of a timer in which a predetermined time is set, and store an image based on the photographing virtual camera when the timer reaches the predetermined time after the start of the count, and until the predetermined time is reached after the start of the count of the timer, control of the photographing virtual camera based on the operation input by the first player is restricted, and the restriction of the control of the first character based on the operation input is cancelled.

4. The one or more storage media according to claim 3, wherein the instructions further cause the computer of the first terminal to:

display a timer image showing a time to be taken until the predetermined time is reached, until the predetermined time is reached after the start of the count of the timer; and transmit information for displaying the timer image on the second terminal, to the second terminal.

5. The one or more storage media according to claim 1, wherein the instructions further cause the computer of the first terminal to:

place a drone object at a position corresponding to the photographing virtual camera when the operation mode of the first player is switched from the character operation mode to the photographing mode; and control at least one of a position and an orientation of the drone object in accordance with a content of control of the photographing virtual camera based on the operation input by the first player when the operation mode of the first player is the photographing mode.

6. The one or more storage media according to claim 5, wherein the instructions further cause the computer of the first terminal to, when the operation mode of the first player is the photographing mode, display a photographing range image showing a photographing range of the photographing virtual camera; and transmit information for displaying the photographing range image on the second terminal, to the second terminal.

7. The one or more storage media according to claim 6, wherein the angle of view of the photographing virtual camera is changeable in accordance with an angle-of-view change operation input by the first player, and the instructions further cause the computer of the first terminal to:

update the photographing range image in accordance with change of the angle of view; and transmit information for displaying, on the second terminal, the photographing range image after the change of angle of view, to the second terminal.

8. The one or more storage media according to claim 1, wherein the instructions further cause the computer of the first terminal to:

when the exit condition for the first character is satisfied regardless of the attack action of the second character, cause the first character to at least temporarily exit the game stage regardless of the operation mode of the first player; and when the exit condition for the first character is satisfied when the operation mode is the photographing mode, switch the operation mode to the character operation mode.

9. The one or more storage media according to claim 1, wherein, even when the operation mode of the first player is the photographing mode, an attack against the second character is not nullified.

10. The one or more storage media according to claim 1, wherein the game is executable by the first terminal alone without communication with the second terminal, and the instructions further cause the computer of the first terminal to, when switching the operation mode, when the game is executed without communication with the second terminal, stop passage of time in the game when the operation mode is switched from the character operation mode to the photographing mode, and cancel the stop of the passage of the time when the operation mode is switched from the photographing mode to the character operation mode, and when the game is executed while a game situation is synchronized with the second terminal, not to stop the passage of the time in the game even when the operation mode is switched from the character operation mode to the photographing mode.

11. The one or more storage media according to claim 1, wherein the instructions further cause the computer of the first terminal to transmit the stored image to the second terminal.

12. The one or more storage media according to claim 5, wherein the instructions further cause the computer of the first terminal to create a virtual room in which players participating in the game can gather, and a player who has created the virtual room, among the players participating in the game, is the first player, and only the first player is allowed to switch the operation mode from the character operation mode to the photographing mode.

13. An information processing system comprising at least a first information processing terminal and a second information processing terminal each including one or more processors and a memory coupled thereto, each processor being configured to control the information processing system such that the processor of the first information processing terminal at least:

executes a game in which a game situation is synchronized with the second information processing terminal;

when an operation mode of a first player of the first information processing terminal is a character operation mode in the game, causes a first character in a virtual space to perform at least a movement action or an attack action in a game stage which is the virtual space, on the basis of an operation input by the first player, causes a second character in the virtual space to perform at least a movement action or an attack action in the game stage, on the basis of communication data received from the second information processing terminal, causes the first character to at least temporarily exit the game stage when an exit condition for the first character is satisfied due to the attack action by the second character, and switches the operation mode of the first player from the character operation mode to a photographing mode when an operation mode change condition for the first player is satisfied in the game; and when the operation mode of the first player is the photographing mode in the game, controls at least any one of a position, an orientation, and an angle of view of a photographing virtual camera for photographing the virtual space, on the basis of an operation input by the first player, stores an image based on the photographing virtual camera in the memory in accordance with an image storing operation input by the first player, and nullifies an attack of the second character against the first character such that the exit condition for the first character is not satisfied due to the attack action of the second character, or nullify exit of the first character from the game stage due to the attack action.

14. An information processing apparatus capable of communicating with at least another information processing apparatus, the information processing apparatus comprising one or more processor and a memory coupled thereto, each processor being configured to control the information processing apparatus to at least:

execute a game in which a game situation is synchronized with the other information processing apparatus;

when an operation mode of a first player of the information processing apparatus is a character operation mode in the game, cause a first character in a virtual space to perform at least a movement action or an attack action in a game stage which is the virtual space, on the basis of an operation input by the first player, cause a second character in the virtual space to perform at least a movement action or an attack action in the game stage, on the basis of communication data received from the other information processing apparatus, cause the first character to at least temporarily exit the game stage when an exit condition for the first character is satisfied due to the attack action by the second character, and switch the operation mode of the first player from the character operation mode to a photographing mode when an operation mode change condition for the first player is satisfied in the game; and when the operation mode of the first player is the photographing mode in the game, control at least any one of a position, an orientation, and an angle of view of a photographing virtual camera for photographing the virtual space, on the basis of an operation input by the first player, store an image based on the photographing virtual camera in the memory in accordance with an image storing operation input by the first player, and nullify an attack of the second character against the first character such that the exit condition for the first character is not satisfied due to the attack action of the second character, or nullify exit of the first character from the game stage due to the attack action.

15. An information processing method executed by a computer of a first terminal capable of communicating with at least one second terminal, the information processing method causing the computer to:

execute a game in which a game situation is synchronized with the second terminal;

when an operation mode of a first player of the first terminal is a character operation mode in the game, cause a first character in a virtual space to perform at least a movement action or an attack action in a game stage which is the virtual space, on the basis of an operation input by the first player, cause a second character in the virtual space to perform at least a movement action or an attack action in the game stage, on the basis of communication data received from the second terminal, cause the first character to at least temporarily exit the game stage when an exit condition for the first character is satisfied due to the attack action by the second character, and switch the operation mode of the first player from the character operation mode to a photographing mode when an operation mode change condition for the first player is satisfied in the game; and when the operation mode of the first player is the photographing mode in the game, control at least any one of a position, an orientation, and an angle of view of a photographing virtual camera for photographing the virtual space, on the basis of an operation input by the first player, store an image based on the photographing virtual camera in a memory in accordance with an image storing operation input by the first player, and nullify an attack of the second character against the first character such that the exit condition for the first character is not satisfied due to the attack action of the second character, or nullify exit of the first character from the game stage due to the attack action.

* * * * *